US009902899B2

(12) United States Patent
Parse et al.

(10) Patent No.: US 9,902,899 B2
(45) Date of Patent: Feb. 27, 2018

(54) MULTIPLE COMPONENT NEUTRALLY BUOYANT PROPPANT

(71) Applicants: Joseph Buford Parse, Stow, MA (US); Bruce Donald Jette, Burke, VA (US)

(72) Inventors: Joseph Buford Parse, Stow, MA (US); Bruce Donald Jette, Burke, VA (US)

( * ) Notice: Subject to any disclaimer, the term of this patent is extended or adjusted under 35 U.S.C. 154(b) by 134 days.

(21) Appl. No.: 14/703,987

(22) Filed: May 5, 2015

(65) Prior Publication Data
US 2015/0232742 A1  Aug. 20, 2015

Related U.S. Application Data

(62) Division of application No. 13/315,152, filed on Dec. 8, 2011, now Pat. No. 9,051,511.

(60) Provisional application No. 61/420,952, filed on Dec. 8, 2010, provisional application No. 61/420,941, filed on Dec. 8, 2010.

(51) Int. Cl.
C09K 8/74 (2006.01)
C09K 8/68 (2006.01)
C09K 8/80 (2006.01)

(52) U.S. Cl.
CPC .................. C09K 8/805 (2013.01)

(58) Field of Classification Search
CPC .................. Y10S 507/906; Y10S 507/924
USPC ........................ 507/269, 273, 906
See application file for complete search history.

(56) References Cited

U.S. PATENT DOCUMENTS 3,127,937 A  4/1964 McGuire, Jr. et al.
3,335,797 A  8/1967 Braunlich, Jr.
3,399,727 A  9/1968 Graham et al.
4,493,875 A  1/1985 Beck et al.
4,541,981 A  9/1985 Lowery et al.
4,547,468 A  10/1985 Jones et al.
4,632,876 A  12/1986 Laird et al.
4,654,266 A  3/1987 Kachnik
4,668,645 A  5/1987 Khaund
4,744,831 A  5/1988 Beck
4,894,285 A  1/1990 Fitzgibbob
(Continued)

FOREIGN PATENT DOCUMENTS

WO  WO 96/27070  9/1996
WO  WO 2008/018966 A2  2/2008

OTHER PUBLICATIONS

International Search Report and Written Opinion of the Int'l Searching Authority issued in corresponding PCT Application PCT/US2011/064011 and dated Apr. 5, 2012.
(Continued)

Primary Examiner — Aiqun Li
(74) Attorney, Agent, or Firm — Goodman Allen Donnelly PLLC; Charles M. Allen, Esq.; Matthew R. Osenga, Esq.

(57) ABSTRACT

Proppant used to keep open a fissure in a reservoir created by hydraulic or other action is disclosed. The proppant demonstrates a reduced specific gravity controlled by the geometry of the structure of the proppant. Proppant must be capable of withstanding the hydrostatic environment of the hydraulic pumping system, pass through a perforation in the casing of the well, travel into the fissure, and, upon reduction of hydrostatic pressure, withstand the closure pressure of the formation. A proppant having neutral buoyancy or substantial neutral buoyancy yet capable of withstanding the hydraulic and closure pressures is described that has a tubular structure hollow in the center with a wall of material sufficiently strong to withstand the majority of closure pressures.

11 Claims, 15 Drawing Sheets

(56) References Cited

U.S. PATENT DOCUMENTS

| | | | |
|---|---|---|---|
| 4,921,820 A | 5/1990 | Rumpf et al. |
| 4,921,821 A | 5/1990 | Rumpf et al. |
| 4,944,905 A | 7/1990 | Gibb et al. |
| 4,977,116 A | 12/1990 | Rumpf et al. |
| 5,068,071 A | 11/1991 | O'Holleran |
| 5,120,455 A | 6/1992 | Lunghofer |
| 5,322,821 A | 6/1994 | Brezny |
| 5,534,348 A | 7/1996 | Miller et al. |
| 6,274,083 B1 | 8/2001 | Clark, III |
| 6,364,018 B1 | 4/2002 | Brannon et al. |
| 6,372,678 B1 | 4/2002 | Youngman et al. |
| 6,582,819 B2 | 6/2003 | McDaniel et al. |
| 6,617,024 B2 | 9/2003 | Sudo et al. |
| 6,758,067 B2 | 7/2004 | Ganan-Calvo et al. |
| 6,772,838 B2 | 8/2004 | Dawson et al. |
| 6,983,797 B2 | 1/2006 | Nguyen et al. |
| 7,036,591 B2 | 5/2006 | Cannan et al. |
| 7,066,258 B2 | 6/2006 | Justus et al. |
| 7,160,844 B2 | 1/2007 | Urbanek |
| 7,237,612 B2 | 7/2007 | Surjaatmadja et al. |
| 7,491,444 B2 | 2/2009 | Smith et al. |
| 7,571,767 B2 | 8/2009 | Parker et al. |
| 7,757,766 B2 | 7/2010 | Lewis et al. |
| 7,772,163 B1 | 8/2010 | Brannon et al. |
| 7,845,409 B2 | 12/2010 | Shinbach et al. |
| 7,849,923 B2 | 12/2010 | Burukhin et al. |
| 8,006,759 B1 | 8/2011 | Cochran, Jr. et al. |
| 2002/0128142 A1 | 9/2002 | Godeke et al. |
| 2006/0016598 A1 | 1/2006 | Urbanek |
| 2006/0065398 A1 | 3/2006 | Brannon et al. |
| 2006/0162929 A1 | 7/2006 | Urbanek |
| 2008/0087429 A1 | 4/2008 | Brannon et al. |
| 2008/0156490 A1 | 7/2008 | Burukhin et al. |
| 2008/0179067 A1 | 7/2008 | Dawson |
| 2008/0271889 A1 | 11/2008 | Misselbrook et al. |
| 2009/0038797 A1 | 2/2009 | Skala et al. |
| 2009/0137433 A1 | 5/2009 | Smith et al. |
| 2009/0178807 A1 | 7/2009 | Kaufman et al. |
| 2010/0160104 A1 | 6/2010 | Dinter et al. |

OTHER PUBLICATIONS

International Search Report and Written Opinion of the Int'l Searching Authority issued in related PCT Application PCT/US2011/063913 and dated Apr. 9, 2012.

Supplementary European Search Report and Written Opinion of the European Patent Office issued in corresponding PCT Application PCT/US2011/064011 and dated Jun. 12, 2014.

Supplementary European Search Report and Written Opinion of the European Patent Office issued in corresponding PCT Application PCT/US2011/063913 and dated Jun. 12, 2014.

MULTIPLE COMPONENT NEUTRALLY BUOYANT PROPPANT

CROSS-REFERENCE TO RELATED APPLICATIONS

This application is a divisional of U.S. application Ser. No. 13/315,152, filed Dec. 8, 2011, now U.S. Pat. No. 9,051,511, which claims the benefit of U.S. Provisional Application Nos. 61/420,941 and 61/420,952, filed Dec. 8, 2010, the contents of which are incorporated herein by reference. This application is also related to U.S. patent application Ser. No. 13/314,255, filed on even date herewith (hereinafter referred to as "Single Component Proppant" application), now U.S. Pat. No. 9,102,867, the contents of which are incorporated herein by reference.

FIELD OF THE INVENTION

The present invention relates generally to proppants for use in hydraulic fracturing and more particularly to neutrally buoyant proppants.

BACKGROUND OF INVENTION

The need for energy has spawned numerous new techniques for recovering hydrocarbons from more and more challenging reservoir environments. One such effort has been the recovery of gas from tight rock formation. In these formations, the rock has a low porosity but the entrapped gas is at high pressures within the rock. Wells are drilled into this rock to liberate the gas and collect it in the well itself for recovery and distribution. Such wells are cased with a steel liner which is cemented to the formation. To generate a communication channel to the rock containing the gas, perforation charges are detonated within the well punching a hole through the steel, cement, and into the rock formation. Penetration of the shaped charge used to penetrate the formation normally extends from a few inches to less than 10 feet. This provides very limited penetration into the gas bearing rock and, therefore, limited ability for the gas to move to the well bore.

To improve communication between the well bore and the rock, hydraulic fracturing of the rock is performed. High pressure water is pumped into the well, through the perforation in the casing and cement, and into the damaged formation caused by the perforation charge. As the pressure exceeds the formation pressure, the rock begins to break along preferential weaknesses. This opens fissures in the rock that extend in vertical fractures. That is, the fractures that are created tend to be larger in the vertical direction than in the horizontal direction by several orders of magnitude Propagation tends to be along stress lines already in the formation. These fissures then form a pathway for the gas to move from the face of the fractured rock to the well bore for recovery. The high pressure forces the gas out of the minimally porous rock when it experiences a significant drop in pressure. The fracture pressure represents hydraulic pressures on the order of the formation pressure (essentially due to the weight of the layers of rock above). After the relaxation of pressure of the hydraulic fracturing fluid, the pressure in the fracture is minimal in comparison to the rock. This means the rock experiences a relatively low surface pressure while experiencing extremely high internal pressures. Diffusion of gas from the internal rock can then flow to the fissure which essentially creates a channel to the well bore. The lack of porosity in the rock eventually depletes the gas at the surface of the rock which exposes the interior rock to the reduced pressures. As this progresses, the depletion layer moves in ever more slowly. This means that for a larger recovery of gas from the rock the greatest value is from the greatest exposure of the surface area of the rock rather than simply providing a pathway for the gas to pass to the well.

Fracturing the rock both provides a greater surface area for diffusion from the rock and improves diffusion of the gas through the rock from the high pressure zone. The greater the surface area exposed, the greater the initial gas produced. However, this also facilitates long term recovery of gas. Therefore, it is beneficial to maintain the transport properties of the fracture.

Hydraulic fracturing causes the rock to separate to create the fracture channel. As the rock fractures, the parted rock is composed of a surface with an opposing mating surface. If the hydraulic pressure is reduced, the result is that the two rock surfaces come together, effectively mating. Thus no channel remains.

To ensure a continuing channel, proppant is inserted into the fracture. The expressed purpose of the proppant is to prop open the channel. This prevents the closure of the rock faces, negative and positive, created upon fracturing due to the randomness of the interstitial proppant material.

While it is useful to create a separation of the two surfaces of the rock composing the wall of the fracture, proppant would be of little value if it did not provide a highly conductive zone to the well bore from the rock face. Granularity produces this conductive character by creating interstitial spaces between the particles composing the proppant through which the gas can flow. The proppant must, then, be strong enough to hold open the formation without losing this interstitial space or percolation network. Fracture of the proppant can occur if the formation pressure is so great that the stress on the particle exceeds its strength and the proppant particles break. When this happens, the particles are forced closer together reducing the overall void space comprising the percolation network. In addition, structural failure can produce fragments of the proppant which further fill the void space and reduce overall conductivity.

There arises the challenge of finding a material which can withstand the closure pressures without losing its percolation network while facilitating flow into the formation crevices to maximize the amount of the fracture that remains open.

Materials which have been used for this purpose have been, for the most part, naturally occurring. Probably the most common is various types of sand. The irregular shapes of the particles prevent close packing resulting in a natural percolation network. The structural strength of the sand prevents formation closure and maintains the network. However, two primary shortcomings are associated with sand. First, the specific gravity of sand tends to be approximately 2.8 making it significantly heavier than the water, a specific gravity of 1.0, or brine, a specific gravity of as much as 1.2, which is used for fracturing and to carry the proppant into position. As a result, the sand tends to settle out during the insertion process. To avoid this, additives are mixed into the water or brine to increase the viscosity and, in some cases, the specific gravity to extend the settling time of the sand.

While this improves the depth to which the proppant penetrates into the fracture, it is believed that little of the proppant reaches more than a relatively small percentage of the total fracture zone. Additionally, the thickening agents themselves have deleterious effects. Under high pressure, the agents can be pressed into the formation rock further reducing its porosity and permeability. The agents and fracturing fluids flow back up the well bore causing a disposal problem. Additionally, some fraction of these agents typically remains trapped in the proppant bed, reducing its permeability.

To optimize the flow of proppant into the fracture while eliminating or reducing the need for thickening agents, proppant must match as closely as possible the specific gravity of the hydraulic fracturing fluid. This would keep the proppant material suspended in the fracturing fluid to allow it to penetrate into all segments of the formation into which the fluid penetrates.

Several techniques are used to reduce the specific gravity of proppant. One is to select a proppant which has a lower specific gravity. Examples of just such a low specific gravity are organic materials such as walnut shells, pits, husks, and the like. However, these lighter materials tend to introduce other limitations. While walnut shells would penetrate deeper into the formation, their structural strength limits their applicability to relatively small formation closure pressures. Crushing the walnut shells eliminates the spaces between the shell fragments, fills them with newly produced small broken particles, and drastically reduces the percolation network.

Another method of reducing the specific gravity of proppant has been to produce light materials as the core of the proppant, most often ceramics and metal oxides, which are then bound together into a particle by use of an adherent or through sintering. Kaolin, clays, and alumina are often used as precursors which may be bound together with a sacrificial binder which is burned off or becomes part of the chemical processing during sintering. Glass spheres both naturally occurring as well as manmade may also be incorporated. This composition provides improved structural integrity and reduced density. However, the material may remain porous and allow degradation during exposure to the fracturing fluid or well flow. And, the particle strength must be balanced against the degree of structural integrity desired. The greater the structural integrity, the greater the general density of the particle, and the less the buoyancy.

Methods of making organic and ceramic proppants less porous and structurally stronger include various methods of coating them with sealing or hardening shells. This does improve their strength but with limitations and at the cost of some of the buoyancy. The harder shell tends to increase the density overall of the proppant particle which requires the core to be lighter and, more likely, less structurally sound. It becomes a balancing effort to add coating at the least cost to proppant weight while increasing the overall strength.

Another method of reducing the specific gravity of proppant while retaining structural strength is to coat a strong but dense proppant with a low specific gravity material such as microspheres. The aggregate specific gravity of the coated particle then is reduced. Coated particles can be better suspended in the fracturing fluid. Once in place, the formation closes on the coated particle causing the coating to break off the particle or, if soft to deform. This may reduce the void space and, therefore, the percolation network.

While coating proppants may reduce their specific gravity, the fundamental properties of the proppant are generally not changed. While some coatings are meant to harden the exterior of the proppant thereby contributing to some strength, coated proppant ultimately behaves as the base particles. Sand, if coated, can have its specific gravity reduced. However, the material strength of the sand remains limited and, if exceeded, fractures producing small fragments which can occlude the interstitial spacing comprising the percolation network. Some coatings may be applied to capture these fragments but then are not designed for reduced or neutral buoyancy. While the coating may reduce the flow of small fragments, the overall change of the size of the fragments of a particle once broken by entropy will occupy more space than they did before breakage. In addition, the coating will occupy space. Therefore, even coated proppant meant to capture these "fines" will have reduced conductivity if the particle fails.

Recognizing the need for stronger proppants, especially for deeper wells where the formation closure pressures are greater and that many of the more common proppants such as sand will fail, stronger proppant which tend to be manufactured have been developed. Ceramic proppants are a primary class of just such a manufactured material. These materials provide strength that allows the proppant to withstand formation closure pressures at depths in excess of those at which sand and other more common proppants fail. However, the materials necessary to produce these hard materials provide strength but at a significant cost in specific gravity. Many manufactured proppants have specific gravities as high as 3.8. While the hardness reduces the structural shortcomings, it exacerbates the difficulty of placement into the fractures.

The primary method of countering excessive specific gravities of proppants has been to thicken the fracturing fluids with various polymerizers. The gel-like consistency allows the heavier proppants to be flowed deeper into the fractures by extending the settling time. Pressures are then increased and higher pumping speeds used to move the fluid and proppant into the fracture. However, this same pressure forces some of the fracturing fluid into the pores of the formation rock. As a result, the already low permeability rock has its pores filled with the thickening agents. It is believed that this further reduces the recovery of gas or oil from the reservoir. It would then be especially beneficial if the amount of thickening agents necessary were either reduced or eliminated all together.

SUMMARY OF THE INVENTION

The invention relates to various exemplary embodiments, including fibers, particles, proppants, products, and methods of making and using the same.

These and other features and advantages of exemplary embodiments of the invention are described below with reference to the accompanying drawings.

DETAILED DESCRIPTION

Figure 1:
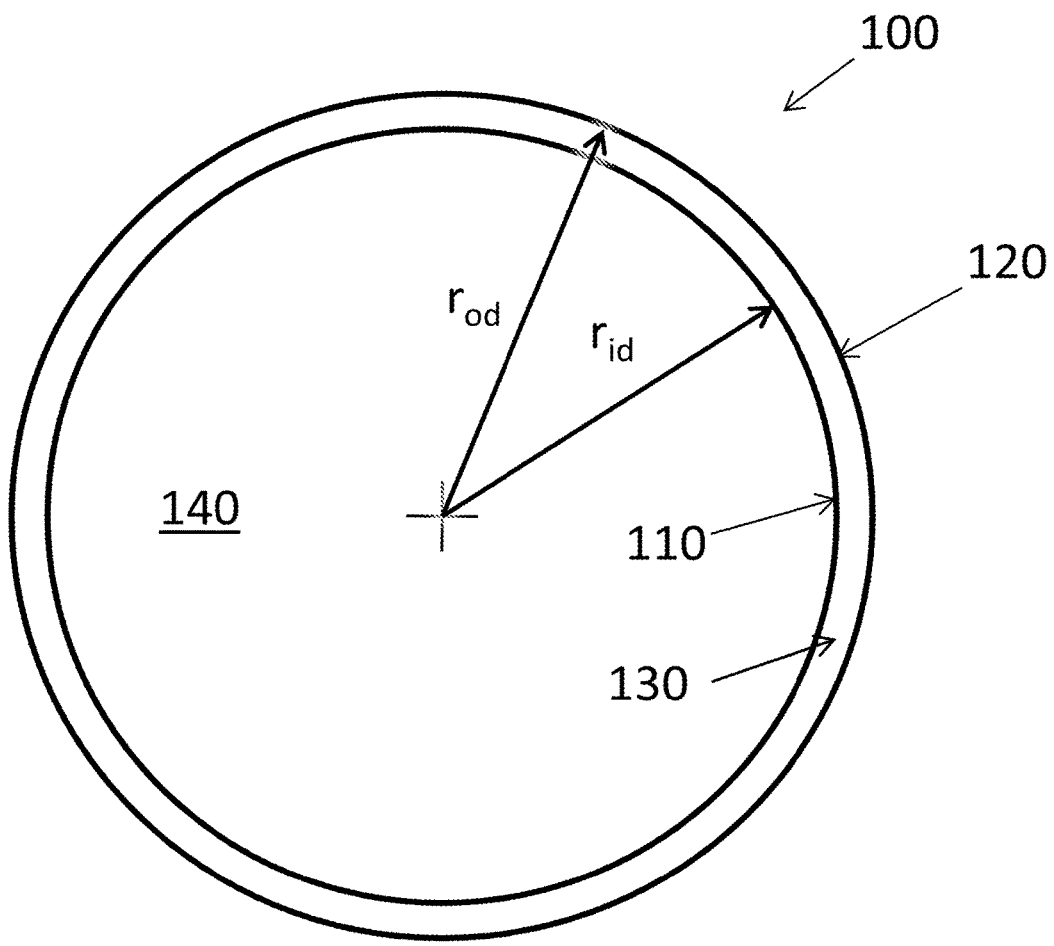
FIG. 1 is a transverse cross-section of a proppant particle having a substantially cylindrical shape.

In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the claims.

There is a need for a manufactured proppant which can be tailored from a material or combination of materials and in sizes to meet specific constraints or requirements during the fracturing process but which provides structural strengths sufficient to withstand the closure pressures of a formation at a specific depth while having neutral buoyancy or substantially neutral buoyancy. The material used in the manufacturing of the proppant must be able to also withstand and remain stable in the general chemical environment. Aggregate quantities of this proppant must also create a percolation network due to voids between particles to allow for flow of gas or oil through the aggregate pack. Other characteristics of the particle include smoothness of the surface to reduce flow friction and graceful degradation in structural fracture, specifically, fragmenting of the particles producing shards rather than small grains which can block the percolation network.

Desirable characteristics of a proppant, then, are that it be easily flowed into the fracture as part of the hydraulic fracturing process, there be little or no damage to the proppant during this flowing process, little or no damage to the pumping system results from the proppant, a percolation network is formed which allows communication from the rock face to the well bore, and the formation closure pressure not cause the loss of the percolation network through reduction of pore size or creation of fragments which substantially fill the pore space. In addition to these primary characteristics, stability in the chemical environment is also essential.

In the "Single Component Proppant" application, a particle is described which has void space in the interior of a closed ended elongated hollow particle. The wall thickness of the particle is selected to withstand both hydrostatic pressures during the pumping process and closure pressures of the formation. To reduce the density of the particle, the particle shape is extended into an elongated particle to increase the void space and, therefore, the ratio of volume to mass. The particle, then, provides an integral source of both buoyancy and structure. In the implementations described herein, these two functions of the proppant, specifically buoyancy and structure, are separated. As will be discussed in detail below, the particle described herein includes a buoyancy component or "boat component" and a structural component. The buoyancy component, then, only needs sufficient strength to withstand hydrostatic pumping pressures allowing the walls to be significantly thinner than in the "Single Component Proppant" application thereby providing a greater control over the specific gravity. The structural component is designed to withstand formation closure pressures and can be designed specifically to meet loading that the boat could not. Joining these two components, the boat and the structural components together permits independent control of the proppant density and strength. It is expected that a large percentage of the boat components may break upon the formation closing, however, the fragments are large in size relative to the wall thickness of their parent boat component and, based upon selection of materials, can contribute to the overall load carrying capacity with little impact on the permeability of the bulk proppant. A fully dense structural component can then be offset by a low density boat to produce a particle of specific desired density.

The present invention relates to the product and methods for producing particles for example hollow spheres or hollow closed ended elongated particles which have a separate component for providing reduced density, the "boat component," and one or more structural components to withstand formation closure pressures. Each component may be formed of glass, ceramic, metals, metal oxides, or a combination such that when the boat component and structural component are joined the particle has a controlled buoyancy. This controlled buoyancy may be neutral buoyancy or substantial neutral buoyancy with respect to the hydraulic fracturing fluid, while retaining structural integrity against hydrostatic or, in the case of the structural component, contact loading. In certain applications it may also be desirable to control the buoyancy of the combined particle that is formed of a boat component and a structural component such that the buoyancy of the combined particle may be positive or negative to a degree desired. The combination of positive and/or negative buoyancy and the particle dimension and geometry permit the particles to migrate vertically to the extent desired in the hydraulic fracture. In these applications, a range of different particle densities, sizes, and geometries may be produced together, or a desired mixture of particle densities, sizes, and geometries may be blended from different batches.

It is to be understood for purposes of the present disclosure that these particles can be useful in many applications, including, but not limited to, as proppants for hydrocarbon recovery operations. It is to be further understood that the term "proppant" or "proppants" while having an understood meaning in hydrocarbon recovery, is used herein to not be limiting to its manner of use. The proppant or proppants described herein are useful in other applications, such as the examples provided below. Set forth below are various implementations of the present invention. However, it is to be understood that while proppant boat component formed of hollow spheres or hollow closed ended elongated particles and their formation are described, it is understood that each and every one of these implementations and features apply to hollow particle forming, the formation of hollow glass or ceramic particles, and their uses.

The present invention provides methods to make hollow spheres or hollow closed ended elongated particles that have a controlled size (transverse dimension), length in the case of all but hollow spheres, and wall thickness to withstand expected hydrostatic pressures, and/or have a controlled density. The present invention provides methods to make hollow or solid spheres, elongated particles, or geometric objects which comprise the structural component of the proppant and are designed to substantially withstand formation closure pressures. The present invention provides methods to make from the two functional components, the boat component and the structural component, a single particle by various methods which has an overall density as desired while retaining the structural integrity to withstand formation closure pressures.

The present invention envisions a substantial portion of the boat components breaking under closure pressure and, by proper selection of materials and minimal size to meet buoyancy objectives, the resulting fragments may contribute to the structural strength while minimizing the deleterious effect on the permeability of the aggregate proppant. The present invention provides resistance to chemical attack and/or enhancement of fluid flow through a dense packing of particles.

The term "controlled" herein preferably means that the one or more properties are "dialed in" to meet the objectives of use for the particular implementation due to the process(es) described below. This ability to achieve control of one or more of these properties is desirable for purposes of achieving desirable strength and/or weight and/or durability and/or use of the particles and is desirable for providing a consistent product to users of the particles, and/or is desirable to provide particles to meet customer needs based on the particular project since the particles can be made based on the "dialed in" specifications that are achievable herein. It is to be understood, that the present invention can have a density of about 0.8 gm/cm³ to 1.75 gm/cm³ and the corresponding specific gravity of about 0.8 to 1.75 which will be less than the density or specific gravity of comparable material and shape having no void in the interior of the boat component.

The implementations described herein relate to a product which is a multiple component neutrally buoyant proppant which is composed of a hollow closed ended elongated particle and a boat component and one or more structural components. The boat component has a uniform and contiguous wall formed of glass, ceramic, metal, or metal oxides. The structural components may be hollow or solid spherical, elongated cylindrical, or otherwise shaped to provide structured support and may be formed of glass, ceramic, metal, or metal oxides. The various components may be joined by being produced in an integrated manner, through fusing components produced through different methods, or through adhesion. The joined components creating a single particle formed in this way will be referred to as proppant although the use of the term does not exclude its use in applications outside of the gas and oil industry. Additional applications will be provided below.

The general term "proppant" is used herein to refer to any type of sized particles to be mixed with fracturing fluid to hold fractures open during or after a hydraulic fracturing treatment. As noted above, proppants are not limited to this application. The term may also include "proppant particles" or fibers that make up such proppant particles.

The term "proppant aggregate" is used herein to refer to a large quantity of the proppant particles such that an aggregate characteristic may be applied to the quantity that may not be directly attributable to individual particles. The term also may include "aggregate."

"Hydraulic fracturing fluid" or "fracturing fluid" is the fluid injected into the rock in hydraulic fracturing. The injected fluid is typically a slurry of water, proppants, and chemical additives. Additionally, gels, foams, and compressed gases, including nitrogen, carbon dioxide and air can be injected. The composition of the fluid may change slightly during the course of the process as it mixes with other substances.

A "neutrally buoyant" particle or body neither sinks nor rises in a particular fluid medium. For example, a proppant is "neutrally buoyant" if its mass equals the mass of the volume of fracturing fluid that it displaces when immersed therein. Because of the different fluids used in fracturing operations, neutral buoyancy may occur in fluids with specific gravities of about 0.8 to 1.75.

The term "substantially neutrally buoyant" is used herein to describe a property of a physical body where the mass of the physical body per unit volume is more than that of an equal volume of the fluid in which it is suspended and, therefore, of greater specific gravity but due to the viscosity of the fluid and the particle size and shape, has a settling time in the fluid less than half that of a similar but fully dense (non-porous solid rather than hollow) particle. As used herein, references to "neutrally buoyant" proppant will include the concept of "substantially neutrally buoyant" proppant unless specifically stated to the contrary.

It should be understood that the goal of neutrally buoyant proppant is to minimize gravimetric segregation of the proppant in the surrounding medium (specifically settling to the bottom). One skilled in the art will recall that the settling (or rising) velocity of a particle in a fluid is described by Stokes' law:

$$V_s = \frac{2}{9}\frac{(\rho_p - \rho_f)}{\eta}gR^2$$

where: $V_s$ is the particles' settling velocity in m/s, (downwards if $\rho_p > \rho_f$, upwards if $\rho_p < \rho_f$); g is gravitational acceleration in m/s²; $\rho_p$ is the apparent density of the particles in kg/m³, and $\rho_f$ is the mass density of the fluid in kg/m³ and $\eta$ is the fluid viscosity in kg m⁻¹ s⁻.

One skilled in the art will also recall that, as hydrostatic pressure of a fluid increases with depth, the density of that fluid will change in accordance with its bulk modulus, and that the apparent density of a substantially neutrally buoyant proppant will also change with hydrostatic pressure in accordance with its detailed structure and the elastic modulus of its component materials, although not in precisely the same manner as the fluid. Similarly, the fluid density and apparent density of a proppant particle will both vary with changes in temperature, although not to the same degree. The implementations described herein are not limited to a precise mathematical relationship between the density of a given fluid and a particular proppant. Rather, these implementations will permit one skilled in the art to manufacture hollow, rigid proppant of a desired apparent density which is lower than about 1.75 g/cc. The proppant will still possess sufficient mechanical strength in both components to withstand the hydrostatic pressures required for creating hydraulic fractures in geological formations, and will also possess sufficient mechanical strength in the structural component to withstand the fracture closure stress required to prop the fracture open after the hydrostatic pressure has been reduced to bring about closure. It is possible that the boat component of the proppant may fracture under formation closure pressures producing fragments which may contribute to the structural strength of the proppant yet which do not become small particles, fines, which block the pores of the percolation network.

In particular implementations, a product is described which comprises multiple component neutrally buoyant proppant which demonstrates a specific gravity of about 0.8 to 1.75 that can be used in hydraulic fracturing of either natural gas or oil wells. Other applications will be defined as well.

In one implementation, the proppant is composed of individual particles that include a boat component and one or more structural components joined together to form a particle of size similar to proppant in current use, typically about 100 µm to 2500 µm outside transverse dimension (OD), although other sizes may also be used. During the fracturing process, many of these particles will remain behind in an aggregate layer between the two surfaces of the fractured formation. This aggregate layer forms the percolation network between the particles and provides the structural integrity primarily through the structural component to hold the fracture open. While a portion of the structural component and a larger portion of the boat component structures may fracture under formation pressures, the particles are overall designed to withstand a target closure stress. To reduce the density of the particles such that a reduced specific gravity is achieved, each particle is formed with a boat component having a hollow interior and sealed ends. A long cylindrical shape is chosen to allow for greater distribution of load while providing an increased encapsulated volume per grain.

Since the proppant is includes two components, the boat component which provides the buoyancy and the structural component which provides the strength against the closure pressures and that each component performs its function essentially independently of the other, it is possible to design the particle by component and join them to achieve specific overall characteristics. Initial design of the particle requires determination of the maximum dimensions acceptable for the particle. This is often to ensure a specific packing density, aggregate layer formation thickness, flowability during pumping, and interaction with the rock surface. This limits the maximum transverse dimension for the structural component and the general size of the boat component. Assuming for the purposes of illustration one or more spherical structural components, it is possible, then, to allocate a specific portion of the maximum length to the boat component. This provides a framework for the design of each component of the proppant.

To design the proppant, a material is selected for each component of the proppant which provides desired characteristics such as strength, density, chemical resistance, availability, manufacturability, and cost effectiveness. It is possible to select one material for the boat component which may be the same as or different from that which comprises the structural component. In this way, it is possible to optimize the properties of each component and the overall characteristics of the proppant particle.

One such example for the boat component would be a glass. Glass is structurally strong, rigid and high in compressive strength; of modest density, with a SG of about 2.0 to 3.0; chemically resistant in all but highly alkaline environments; manufacturable; readily available; and, given to its derivation from sand and common chemicals, cost effective. Glass properties such as strength, chemical resistance, and cost are well known versus their chemical compositions allowing for a broad selection of possible candidate materials.

A maximum hydrostatic pressure is defined by the maximum pumping pressures to be used in the fracturing process. This will help define an acceptable wall thickness for the boat component. Modeling of the stresses in such a closed elongated particle allows for minimizing the wall thickness while retaining sufficient strength to withstand the pumping pressures.

For a given pumping pressure, then, a wall thickness can be combined with a maximum particle transverse dimension and length to define the hollow closed end elongated structure comprising the boat component. Knowing the maximum allowable length, the boat component can be extended to extend the void space. As the particle is extended in length, there is more material comprising the particle due to the particle wall increasing in length. However, the void space is increased as well. It is possible to decrease the specific gravity of the boat component to a desired value or the minimum value at the maximum acceptable length through this design.

An implementation according to the present invention is shown in FIG. 1. Boat component 100 is shown implemented having a substantially cylindrical cross section shape. Boat component 100 is formed of a specific material and includes an inner wall 110 at a radius from the center, $r_{id}$, and an outer wall 120 at a radius from the center, $r_{od}$. The boat component size can be specified by defining the $r_{od}$ of the wall 120. The thickness of the wall structure 130 can be defined by defining the $r_{id}$ of the wall 110. This creates a void space 140 internal to the boat component defined by the inner wall 110. A wall structure 130 of sufficient thickness provides boat component 100 with sufficient strength to withstand hydrostatic pressure of a fracturing fluid from a hydraulic fracture. Wall structure 130 may be formed of a material that is substantially impervious to the fracturing fluid; boat component 100 has a density that is less than the density of the fracturing fluid.

Figure 2:
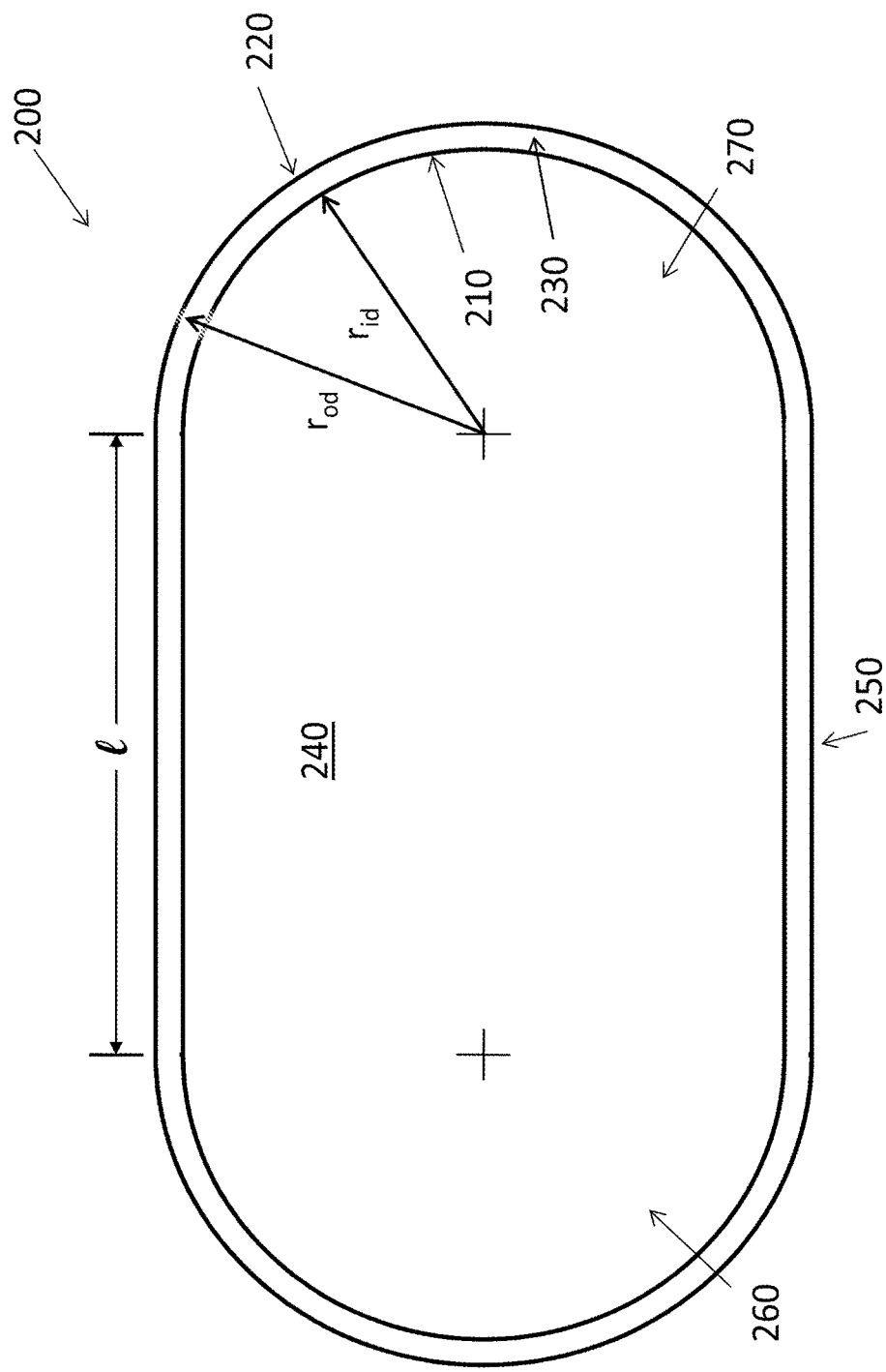
FIG. 2 is a longitudinal cross-section of a proppant particle having an elongated shape.

A second implementation of boat component 200 is shown in longitudinal section in FIG. 2. Boat component 200 is shown implemented having an elongated shape with closed ends. For simplicity of analysis the closed ends are considered to be hemispherical in character. The inner wall 210 at a radius $r_{id}$ from the center of each hemisphere may be defined independently of the outer wall 220 at radius $r_{od}$. A wall structure 230 of a particular thickness is defined by these two radii. Between these two hemispherical ends is a cylindrical segment 250 of length l comprised of a wall structure 230 of thickness comparable to that of these hemispherical ends forming a single interior void space 240. Wall structure 230 provides boat component 200 with sufficient strength to withstand hydrostatic pressure of a fracturing fluid from a hydraulic fracture. Wall structure 230 may be formed of a material that is substantially impervious to the fracturing fluid; proppant particle 200 has a density that may be less than the density of the fracturing fluid.

Boat component 200 includes cylindrical segment 250 and end portions 260, 270. End portions 260, 270 may have slightly different shapes. For example, end portions 260, 270 may be substantially hemispherical, substantially flat, or substantially elongated.

A sphere of a given volume is defined only by its outer radius, $r_{od}$. Therefore, for a volume of a sphere is fixed for a given $r_{od}$. Clearly since the density is a constant for a given material, the total mass of a sphere given a defined outer radius, $r_{od}$, can only be reduced by increasing $r_{id}$.

For the same material, it is possible to examine the strength of the wall at a given thickness $$(r_{od} - r_{id}) = T_w \text{(thickness of sphere wall)}$$

Specific gravity is defined as the ratio of the density (mass per unit volume) of a substance or object to the density (mass per unit volume) of a reference substance. Normally this reference substance is water at standard temperature and pressure or 1 gm/cm³. Since the volume of the hollow sphere is defined for a given $r_{od}$, the specific gravity can only be changed by reducing the wall thickness, $T_w$, by increasing $r_{id}$. It is desirable to create a proppant having a specific gravity (SG) equal or close to the SG of the hydraulic fracturing fluid.

Figure 3:
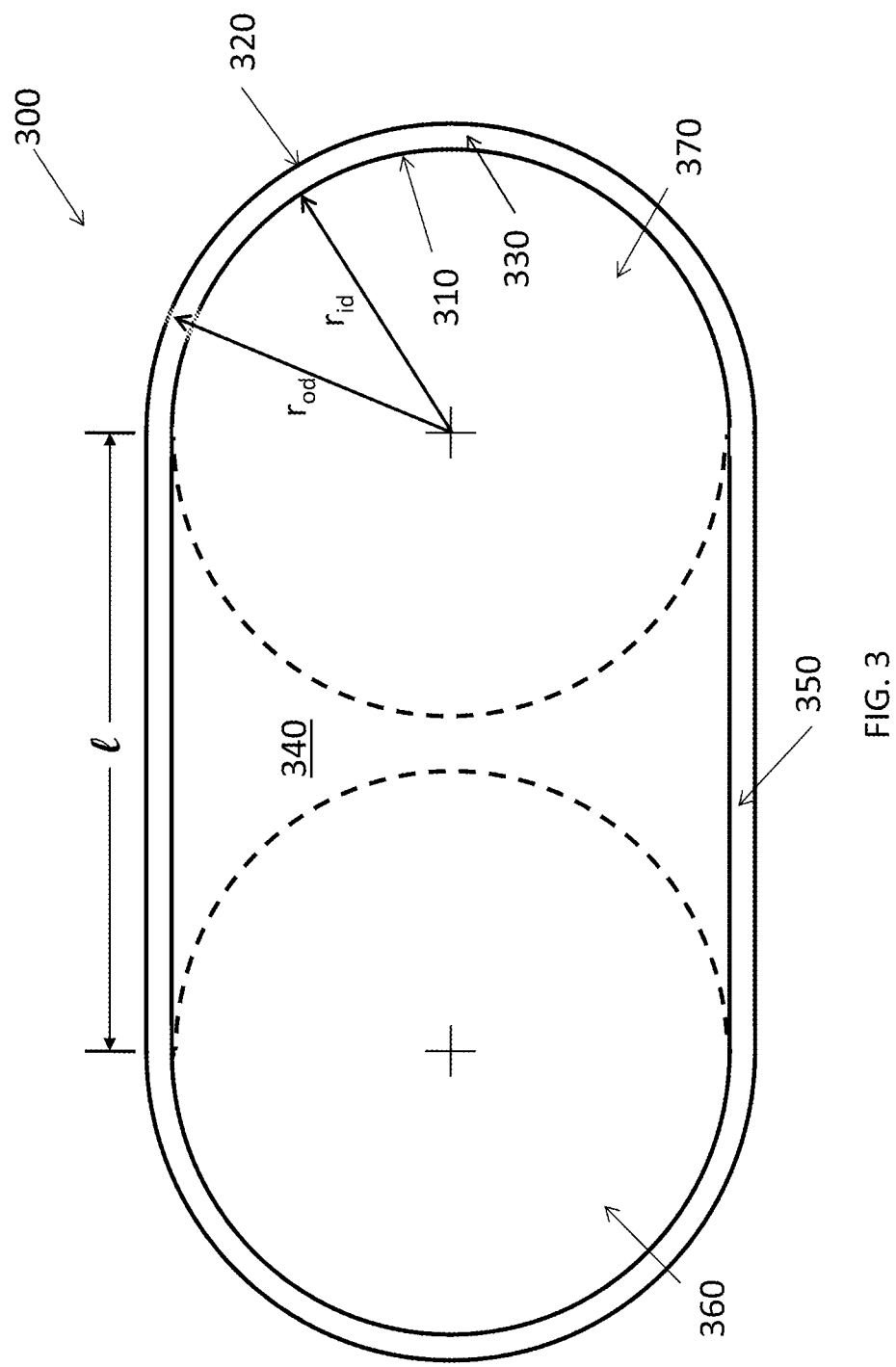
FIG. 3 is a longitudinal cross-section through an elongated cylindrical particle of overall length representing the length of two spheres of the same outside diameter.

As shown in FIG. 3, by extending one axis of the sphere, hollow closed ended elongated structure 300 with hollow hemispherical ends 310, 320 can be achieved which increases the total void space of the boat component for a given transverse dimension. A similar analysis of the volume to that above may be made assuming the elongated structure is cylindrical.

$$\frac{4}{3}\pi r_{od}^3 + \pi r_{od}^2 l = V_c \text{ (volume of cylinder)}$$

$$\frac{4}{3}\pi r_{id}^3 + \pi r_{id}^2 l = V_{vc} \text{ (volume of hollow cylinder void)}$$

$$\frac{4}{3}\pi(r_{od}^3 - r_{id}^3) + \pi l(r_{od}^2 - r_{id}^2) = V_{wc} \text{ (volume of wall)}$$

$$V_{cw}\rho_s = M_{cs} \text{ (mass of sphere)}$$

$$\left[\frac{4}{3}\pi(r_{od}^3 - r_{id}^3) + \pi l(r_{od}^2 - r_{id}^2)\right]\rho_s = M_c \text{(mass of the cylinder)}$$

This shows that the volume of the hollow cylinder is greater than a hollow sphere of equal size and wall thickness by the volume of the cylinder:

$$\pi l r_{od}^2 = \text{volume of cylindrical segment}$$

$$\pi l r_{id}^2 = \text{volume of cylindrical void segment}$$

$$\pi l(r_{od}^2 - r_{id}^2) = \text{volume of cylindrical wall segment}$$

Therefore, for a given boat component with equal $r_{od}$ and $r_{id}$ to that of a comparable spherical boat component, the increased volume is directly proportional to the length of the cylindrical segment, l. It is not as clear what effect the added cylinder wall would have on the mass of the particle. Simply multiplying the volume of the cylindrical wall segment, above, by $\rho_s$ provides no additional insight. Consider instead comparing a hollow cylindrical proppant particle which is no longer than 4 times the $r_{od}$. This allows direct comparison of two spherical particles of equal $r_{od}$ to a single hollow cylindrical having the same dimensions. FIG. 3 shows the comparison graphically.

Using a specific material is the simplest way to provide a clear understanding of the value of the cylindrical length.

Assuming:

$r_{od} = 0.150$ mm $r_{id} = 0.100$ mm $l = 2r_{od} = 0.300$ mm $\rho_s = 2.23 \times 10^3 \frac{g}{mm^3}$ Below is the comparison of the resulting critical mm/mm³ characteristics:

| Boat Component | "l" | Volume (mm³) | Mass (gm) | Density (gm/cm³) |
| --- | --- | --- | --- | --- |
| Hollow Sphere | | 1.414E−02 | 2.218E−05 | 1.569259 |
| Hollow Spherical Ended Cylinder | $2r_{od} = .3$ mm | 3.534E−02 | 4.85E−05 | 1.371037 |
| Hollow Spherical Ended Cylinder | $4r_{od} = .6$ mm | 5.655E−02 | 7.47E−05 | 1.321481 |
| Hollow Spherical Ended Cylinder | $6r_{od} = .9$ mm | 7.775E−02 | 1.010E−04 | 1.2989562 |

The additional mass is offset by the significant increase in volume. That is reflected in the particle density. For an assumed transverse dimension and wall thickness, it is possible to essentially define the density and, therefore, specific gravity.

The effect of wall thickness on strength of the boat component under hydrostatic pressure may be evaluated. If a cylindrical shape is chosen for ease of calculation, and the ratio of boat component wall thickness to boat component outside radius is less than approximately 1:10 then the body of the boat component may be considered as a thin-walled cylinder. In this case the circumferential of hoop stresses in that thin-walled cylinder may be evaluated as follows:

Circumferential stress, $s = \Delta P \times (R/t)$,

Where $\Delta P$=pressure differential between inside and outside of the boat component;

R=outer radius of boat component;

t=wall thickness of boat component.

As the compressive strength of borosilicate glass, for instance, is on the order of 200,000 psi, at the limit of the thin-walled cylinder geometry, with a borosilicate boat component having a ratio of boat component wall thickness to boat component outside radius is less than approximately 1:10, the boat would be expected to withstand pressures on the order of 200,000/10=20,000 psi, which pressure will suffice for many applications. One skilled in the art will be aware that other mathematical relationships may be used to estimate the stresses in thicker-walled cylinders. Thus the scope of the present invention is not limited to boat components whose wall thickness is less than or equal to 1/10 of their outer transverse dimension. Similarly, if a given level of hydrostatic pressure is necessary to create a fracture in a particular application, the boat component of a multi-component proppant may be designed to withstand that pressure but it may be advantageous not to design it for much higher pressures as the additional mass required might be more utilized to greater advantage in the structural component described below.

A characteristic found uniformly to be useful is surface smoothness. A smooth surface provides a decreased resistance to flow. The smooth surface reduces points on the surface that can cause stress concentrations. Finally, the smooth surface provides a consistent surface on which the loads can be consistently applied.

With a smooth surface hollow closed ended elongated boat component, it is possible to manufacture an engineered boat component having particular stress/strain characteristics sufficient to withstand the hydrostatic pumping pressure pressures yet capable of achieving positive, neutral, or substantially neutral buoyancy. Design of the boat component must begin with the target hydrostatic pressure.

While the following design discussion facilitates determining the physical dimensions of a boat component, their specifics are dependent on performance limitations. Closure pressure of the formation is the primary source of fracture in the boat component as will be discussed.

Knowing the expected hydrostatic pressure, the expected mass of the support component, and the density of the fracturing fluid, it is possible to optimize the design of the boat component. An example will follow.

Another factor important to the feasibility of this proppant is not just its ability to withstand the formation closure pressures, but also the hydrostatic pressures experienced during pumping. Generally, it is possible to assume that if the particle will survive the closure pressures, it will survive the appropriate hydrostatic pressures necessary to emplace it. This is due to the fact that once a hydraulic fracture in a geological formation has been initiated, the hydraulic pressure for fracture growth (the treating pressure) is usually not substantially larger than the formation pressure, but is hydrostatic in nature. It is known to those skilled in the art that the formation stresses which produce the closure pressure are generally not hydrostatic. One skilled in the art will recall that hydrostatic stresses are the same in every direction. Materials fail in response to deviatoric stresses, in which the stresses are different in different directions. The deviatoric stresses on a particle due to formation closure pressure are much larger than those due to the hydrostatic pressure used to grow the hydraulic fracture.

The boat component may have a closed ended elongated shape. The shape may vary slightly due to the manufacturing process without changing the purpose or general character of the boat component. The boat component size may have a transverse dimension as measured from side to side for the closed ended elongated shape (referred to as an elongated boat component) from about 100 μm to 2500 μm outside transverse dimension (OD). For the elongated boat component, the length of the particle is measured from the end of the boat component's substantially constant sized ended segment to the opposing substantially constant sized ended segment. This length may be from about 1 time the transverse dimension, a sphere, to about 6 times the transverse dimension, an oblong pill shaped boat component. This provides a length of about 100 μm to 15,000 μm.

Figure 4:
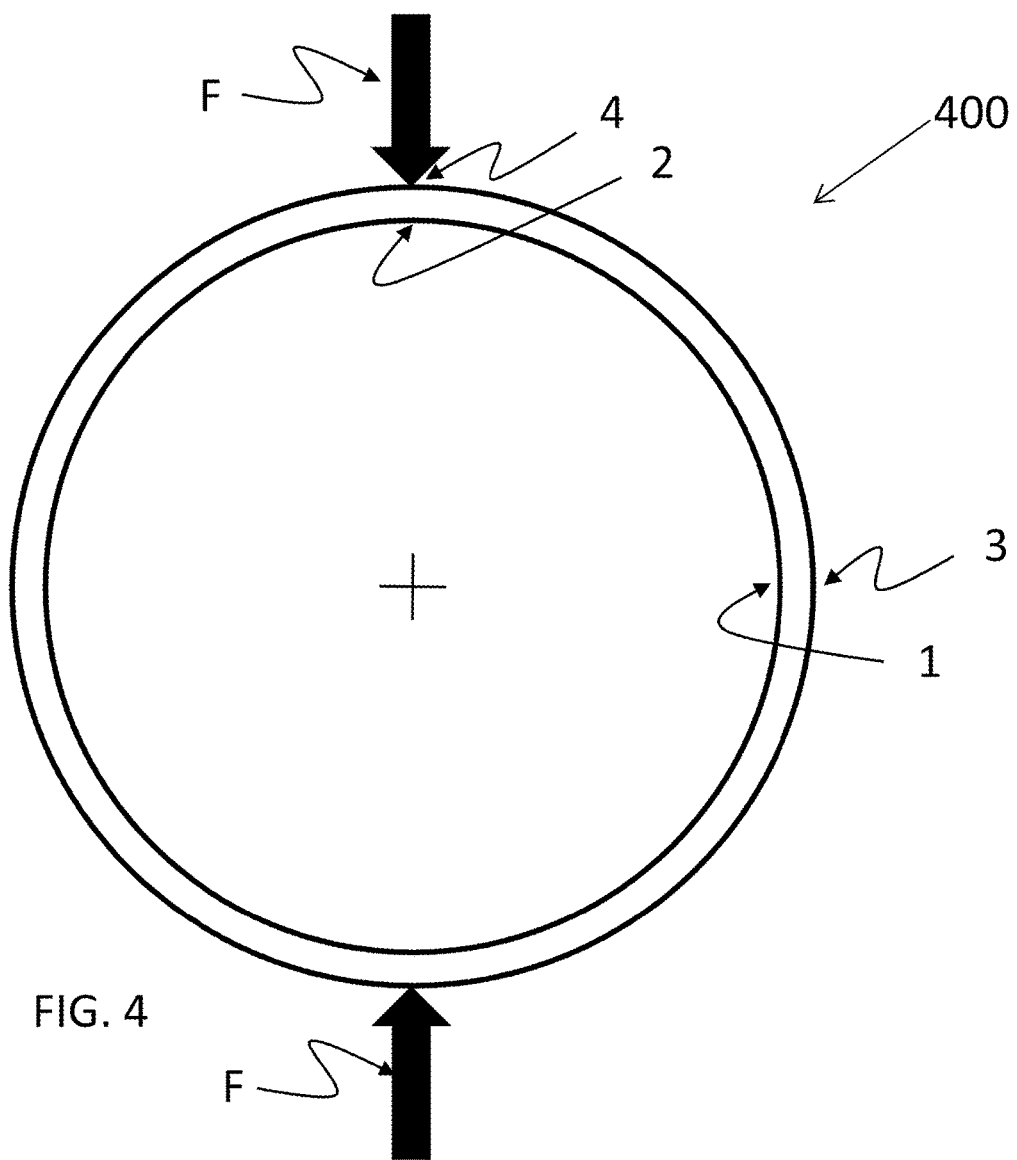
FIG. 4 is a graph showing the location of peak stresses in hollow cylindrical bodies subjected to transverse point loading.

In this implementation, the boat component, particularly the elongated particle, has a closed end. This end may be substantially hemispherical in character as shown in FIG. 4, but may also vary significantly in shape by design or simply by manufacture. Thus, an elongated cylindrical boat component may have a nominally flat closed end; closed end portions of which have a radius less than the radius of the cylinder itself; and/or portions of which have a radius greater than the radius of the cylinder itself. A closed end may also be formed when the end of the boat component is closed by pinching, cutting, pulling, or shrinking; or any combination of these forms. It is to be further understood that when the cross section of the elongated boat component is not perfectly circular the above description of the closed end in the case of a substantially cylindrical boat component does not limit the scope of the invention to closures which are rotationally symmetric.

Similarly, the implementations described in FIGS. 5-10 have been depicted with substantially constant wall thicknesses. It is to be further understood that the process of closing the ends of the elongated or cylindrical boat component may result in deviations from a constant wall thickness and thus the depictions in FIGS. 5-10 do not limit the scope of the invention to closures which have a constant wall thickness.

The boat component contains void space in the interior segregated from the exterior by a contiguous wall. This wall thickness may be from about 35% of the OD of the particle to about 0.5% of the particle OD. This wall should be nominally uniform but may include some non-uniformity, particularly near the ends of the particle.

While the primary design requirement for the boat component is the resulting hydrostatic strength and density, the boat component can withstand uniaxial contact pressure applied along the long surface of the closed ended elongated boat component. In a uniform mono-layer of particles, the boat component can be designed to withstand uniaxial contact pressures that range from about 0.1 pound per square inch to about 4,000 pounds per square inch to about 8,000 pounds per square inch to about 12,000 pounds per square inch up to about 22,000 pounds per square inch.

The stresses caused by uniaxial contact pressures due to formation stresses may be evaluated as described below:

A cross-section of an implementation of a cylindrical boat component of a multiple component proppant is shown in FIG. 4. The cross-section can be considered as a thick walled cylinder. Hollow pins and rollers have been extensively studied (see for example Roarks Formulas for Stress and Strain, 7'th Ed., McGraw-Hill, 2001) and show comparable characteristics. In the analysis, the hollow cylinder is considered to be loaded as shown in FIG. 4. Load p (per unit length) is applied to proppant 400. Points 1, 2, 3, and 4 provide indications of stress levels at key points of peak stress.

$$\sigma = K \frac{2p}{\pi b}$$

where p=load/unit length of the pin; K depends on the ratio a/b determined in the table below (plus sign indicates tension, negative sign indicates compression).

| Point | a/b | | | | | | | |
|---|---|---|---|---|---|---|---|---|
| | 0 | 0.1 | 0.2 | 0.3 | 0.4 | 0.5 | 0.6 | 0.7 |
| 1 | −5.0 | −5.05 | −5.30 | −5.80 | −7.00 | −9.00 | −12.9 | −21.4 |
| 2 | +3.0 | +3.30 | +3.80 | +4.90 | +7.00 | +10.1 | +16.0 | +31.0 |
| 3 | 0 | +0.06 | +0.20 | +1.0 | +1.60 | +3.0 | +5.8 | +13.1 |
| 4 | +0.5 | +0.40 | 0 | −0.50 | −1.60 | −3.8 | −8.4 | −19.0 |

Application of this analysis to proppant 400 shown in FIG. 4 requires one other design choice prior to determining dimensions of the proppant. That choice is selection of the material to use. Glass has a number of desirable characteristics. It is strong in compression (to about 200,000 psi). In tension, virgin glass has been shown tensile strengths up to 1M psi. Often glass is exposed to and damaged by the environment which decreases its tensile strength. A review of FIG. 4 and the table above shows that point 2 is always in tension. Point 3 is also consistently in tension but to a much lesser degree. This would imply that point 2, a point on the interior of the sealed cylinder, will be composed of glass that has properties close to virgin glass, and thus a higher tensile strength than the material located at point 3.

The boat component can withstand hydrostatic pressure applied uniformly to the exterior surface the spherical or cylindrical boat component. Individual boat component can be designed to withstand uniform hydrostatic pressures that range from about 0 pounds per square inch to about 4,000 pounds per square inch to about 8,000 pounds per square inch to about 12,000 pounds per square inch to about 18,000 pounds per square inch up to about 24,000 pounds per square inch. Because the boat component will be stronger under hydrostatic loading than under the deviatoric stresses induced by closure, it is expected that the failure mode for the boat component will be due to deviatoric stresses created during formation closure. While fracture of the boat component is possible or even probable, such fracture does not preclude the proppant's functionality.

Should fracture of the boat component occur, the residual material may affect the aggregate proppant strength, and permeability of the propped fracture. Material selection and design of the boat component will influence the specifics of the outcome. For example, a boat component may formed of borosilicate glass that breaks into fragments whose length and width are large in comparison to the wall thickness of their parent boat component, rather than fine grains whose length and width are comparable to the wall thickness of their parent boat component. This has been demonstrated experimentally at closure pressures up to 12,000 psi using Berea Sandstone counterfaces. The boat component described herein may withstand closure pressures of up to about 22,000 psi.

These fragments whose length and width are large in comparison to the wall thickness of their parent boat component will contribute to the load bearing capacity of the aggregate proppant. Because of this load bearing contribution, it is possible that the fragments may contribute to the randomness of the arrangement of the proppant particles and prevent them organizing into the closest packing.

A second character of the aggregate proppant is the ability of liquids, gases, or the combination of both to flow or diffuse through the void spaces created by the proppant particles. If the residual fragments resulting from fracture of the boat component were sufficiently small, they could contribute to reducing that flow or permeability of the aggregate proppant. If the particles are small enough to move in the matrix, they will tend to move with the flow until they are captured by an opening too small for continued movement. This, in turn, may enhance subsequent capture of additional particle fragments. The end state is that the fragments then reduce the number and effective size of voids and passages resulting in an overall reduction in porosity and permeability. Therefore, flow or permeation through the aggregate proppant may be reduced. Selection of materials can reduce this affect. For example, borosilicate glass tends to fragment into large shards rather than small fines. This will tend to cause them to be captured at the site of fracture and, as discussed in the previous paragraph, become part of the structure of the aggregate proppant matrix. Fewer fragments will flow through the aggregate proppant and form blockages in the flow matrix. This can be further enhanced by use of coatings to trap the fragments at or close to the site of fracture. Further, the cross section of the boat component may be grooved internally or otherwise designed and manufactured to predispose the boat to fracture into larger, immobile particle fragments rather than small, fine fragments. Additionally, it will be recognized that when the boat component fractures into fragments which are large in comparison to the wall thickness of their parent boat component, these fragments will tend to be arch-shaped in cross section. This has been demonstrated experimentally at closure pressures up to 12,000 psi using Berea Sandstone counterfaces. The effect of these arch-shaped fragments may be to enhance both the permeability of the aggregate proppant and its load bearing characteristics.

Because the boat component will normally have very thin wall thicknesses and the total mass of the boat component walls will be small in comparison to the proppant particle, the amount of fines produced should the boat component walls fracture will be small in proportion to the total mass of multiple component proppant. Selection of materials and/or coatings for these walls can also reduce the deleterious effect these fines have on the flow characteristics by preferentially creating fragments which are trapped at or near the site of fracture. These trapped fragments may become part of the structure of the proppant matrix and may enhance the void space. Furthermore, the fragments so trapped are less likely to flow to subsequent sites to form blockages.

The boat component may be composed of glass, such as A, C, E, and S glass, unique formulations of glass for particular strength and fracture behavior such as but not limited to borosilicate glass nominally composed of, for example, 80.6% $SiO_2$, 13.0% $B_2O_3$, 4.0% $Na_2O$, 2.3% $Al_2O_3$; fused quartz, quartz, sapphire, or aluminosilicate; metals including aluminum, magnesium, iron, or copper, titanium, zirconium, or any combination or alloy of these metals; ceramics including but not limited to aluminum oxide, respective metal oxides, zirconium oxide, magnesium oxide, or any combination of these; silicon oxide, silicon nitride, silicon carbide, or combination of these materials.

The boat component may be designed to have a nominal density from about 0.1 grams/cm$^3$ to about 1.0 grams/cm$^3$ to about 1.4 grams/cm$^3$ to about 1.75 grams/cm$^3$.

The one or more structural components of the multiple component neutrally buoyant proppant may be formed of the same or a different material as the boat component. The purpose of the structural components is to hold the fracture open, even in the event that the boat component breaks or fractures. The structural components disclosed herein may be of any convenient shape, including but not limited to such shapes as spheroidal, truncated-spheroidal, blocky, polyhedral, cylindrical, tubular, or shapes intermediate between these. In the event that the boat component fractures, fragments of the boat may or may not remain attached to the structural components.

The maximum transverse dimension of the multiple component neutrally buoyant proppant may be determined by the design of the hydraulic fracturing process or by the details of the pumping apparatus. In either situation, the one or more structural components may be smaller than, similar too, or larger in transverse dimension than the boat component. The material of the structural components will have been selected so as to fulfill its task to hold the fracture open in the event that the boat component fractures. The material properties required to fulfill this task will vary with the mechanical properties of the geological formation being fractured and with the fracture closure stress.

In one implementation, the material of the structural component or components should have a compressive strength at least about 4.23 times the compressive strength of the geological formation. In this situation, the structural components will act as a rigid indenter such as that used in mechanical indentation hardness testing while fulfilling its task of holding the fracture open.

In another implementation, the material of the one or more structural components may be chosen to have a lower compressive strength than the geological formation, such that the structural components deform under load, increasing their load-bearing area and thus fulfilling the task of holding the fracture open.

In another implementation, the material of the structural components may be chosen to have a compressive strength between that of the formation and about 4.23 times that of the formation.

Having designed the boat component and structural component, the proppant particle is fully completed when these two components, to include one or more structural components, form a single entity. As discussed above, the overall dimensions of the proppant particle may be developed based upon specifics of application such as fracturing techniques, pumps, fluids, perforations, formation type, and fracture design. Above, it was shown how the structural component may be designed to withstand the formation pressures and fit within the defined size limits. Similarly, it was also shown above how the boat component may be designed to achieve a degree of buoyancy desired for the overall particle. While these functions and components may be defined and designed separately, they may be produced from a single precursor to form an inherently integral proppant particle or they may be produced separately and joined in an integral manner such as thermally fusing or welding, or they may be produced separately and joined through the use of an adhesive bonding material. Each of these particles will be discussed and their methods of forming presented.

Figure 5:
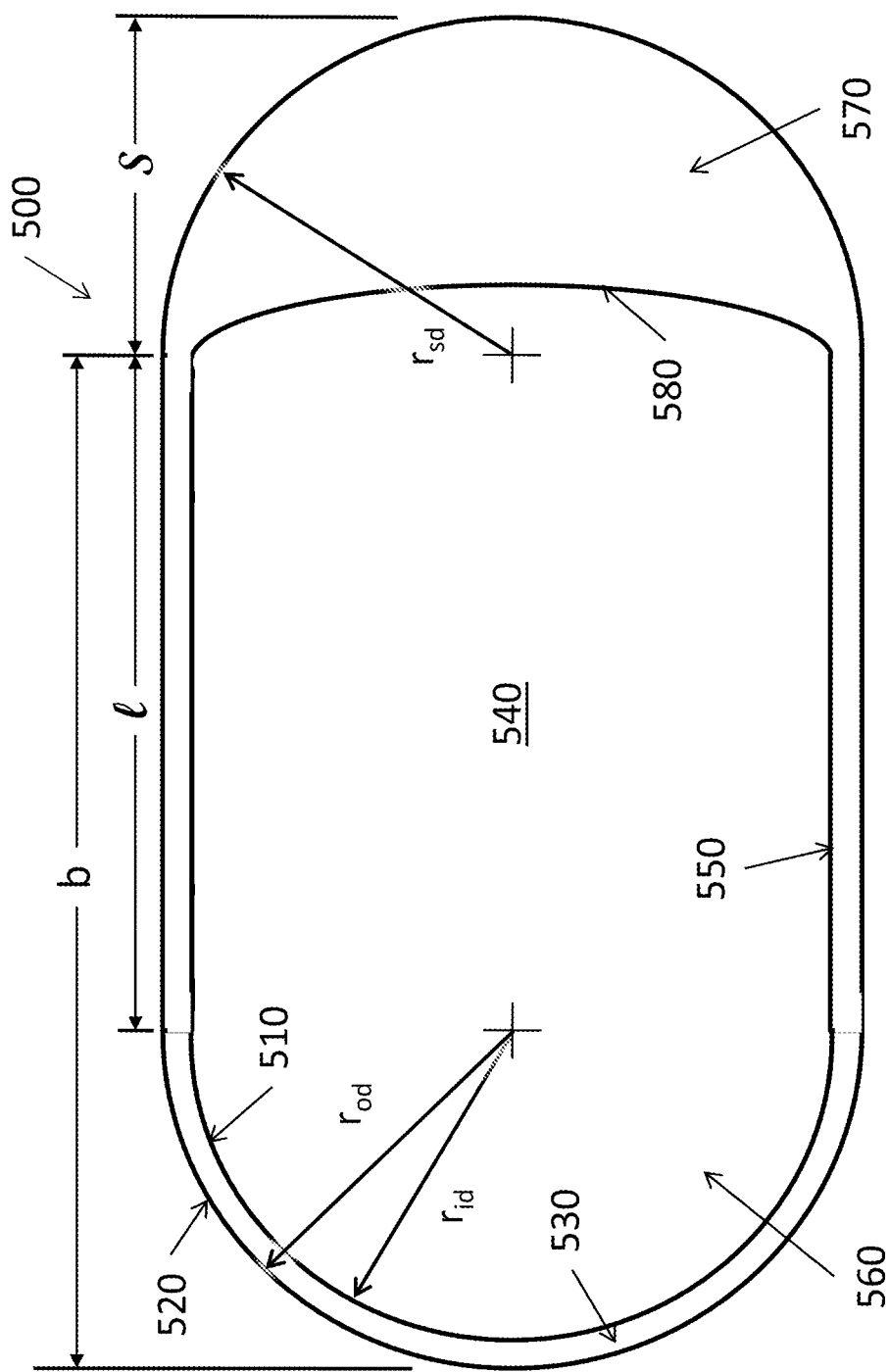
FIG. 5 is a partial cross-section showing a multi-component particle composed of a boat component and a single structure component where they are joined integrally—Single Integral Proppant.

FIG. 5 represents a multiple component proppant particle in which the structural component is comprised of the same material as the boat component and which was produced from a single precursor to form an integral proppant particle having a single structural component. For convenience of discussion, the proppant particle as described in FIG. 5 will be referred to as "Single Integral Proppant." The Single Integral Proppant particle 500 is composed of a boat component b and a structure component S. The boat component b is presented here as a closed ended elongated structure with one end nominally hemispherical 560 having an internal wall 510 of radius $r_{id}$ and an external wall 520 of radius $r_{od}$ forming a boat component wall structure 530 which may be but is not required to be fully uniform throughout the boat component. While a hemispherical end is depicted, this is not meant to limit the invention to this particular shape and others such as flat or elongated may be used to provide additional features such as surfaces to which it may be easier to adhere or deviation may be due to manufacturing methods such as cutting, crimping, melting, pulling, or twisting.

The boat component also comprises of an elongated segment 550 of length l and radius $r_{id}$. In this particular implementation, the structural component S is composed of the same material as the boat component and is formed from the hollow precursor form by melting or forming the one end into a structural component 570 of size and shape necessary to meet the design characteristics. The combination of the internal wall 510 of radius $r_{id}$, the elongated segment 550 of length l and interior wall 580 of the structural component define the interior void 540. The exterior wall of the structural component may have a nominal radius $r_{sd}$ with an interior wall 580 that will form naturally during the formation process. For example, if the process incorporates melting a region of a hollow fiber, the structural component develops a predictable external wall having a nominal radius $r_{sd}$ and the interior wall 580 tends to have a curvature with a significantly greater radius than $r_{sd}$ often with a small dimple in the center (not depicted) residual of the hollow region.

Figure 6:
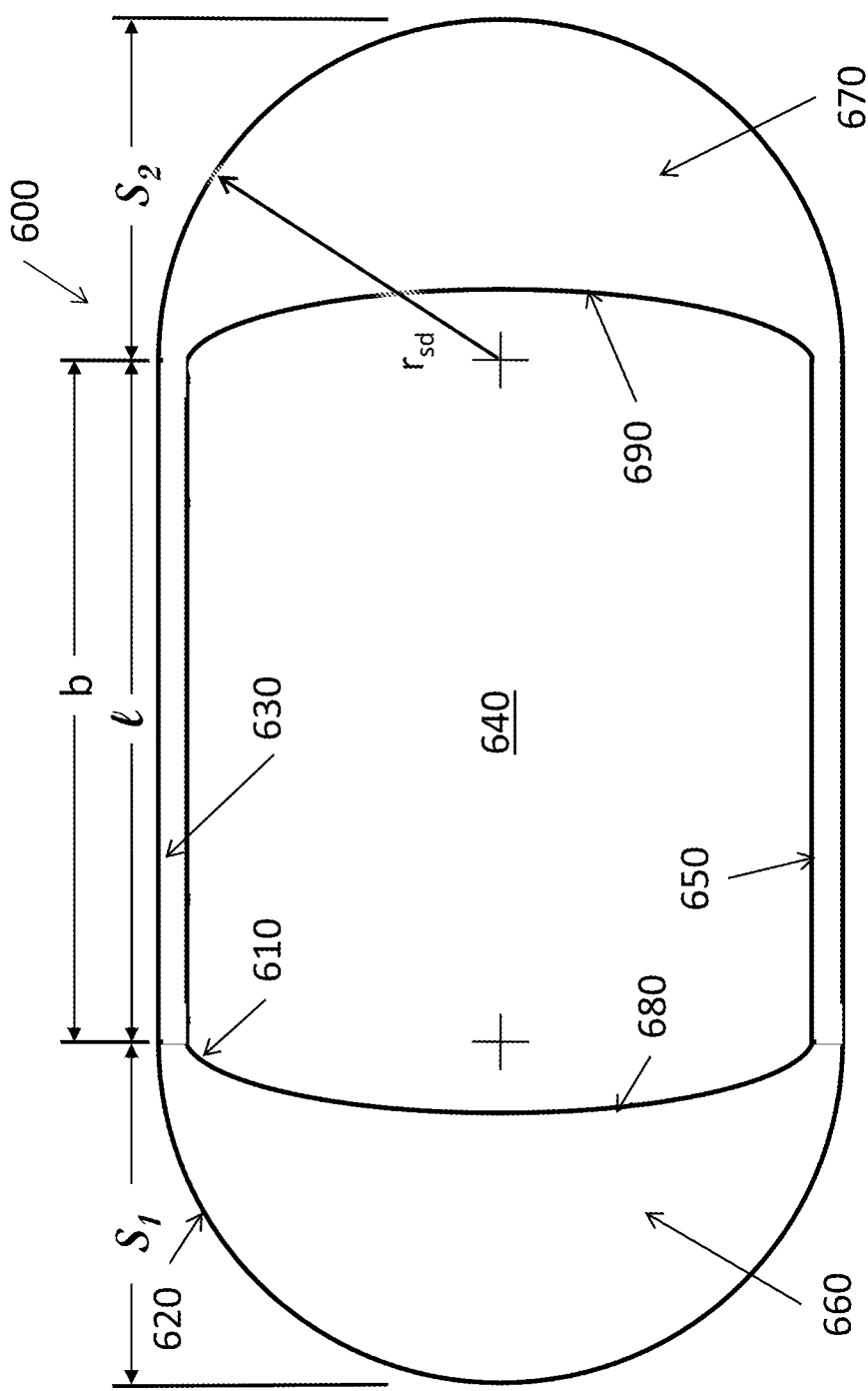
FIG. 6 is a partial cross-section showing a multi-component particle composed of a boat component and two structure components where they are joined integrally—Double Integral Proppant

FIG. 6 represents a multiple component proppant particle in which the structural component is comprised of the same material as the boat component and which was produced from a single precursor to form an integral proppant particle having two structural components. For convenience of discussion, the proppant particle as described in FIG. 6 will be referred to as "Double Integral Proppant." The Double Integral Proppant particle 600 is composed of a boat component b and two structure components S1 and S2. The boat component b is presented here as a closed ended elongated structure with an internal wall 610.

The boat component also comprises of an elongated hollow segment 650 of length l and a wall 630 of a defined thickness. In this particular implementation, the structural components S1 and S2 are composed of the same material as the boat component and are formed from the hollow precursor form by melting or forming the ends into a structural component 660 and 670 of size and shape necessary to meet the design characteristics. The exterior wall of the structural component may have a nominal radius $r_{sd}$ with interior wall 680 and 690 that will form naturally during the formation process. For example, if the process incorporates melting a region of a hollow fiber, the structural component develops a predictable external wall having a nominal radius $r_{sd}$ and the interior walls 680 and 690 tend to have a curvature with a significantly greater radius than $r_{sd}$ often with a small dimple in the center (not depicted) residual of the hollow region. The region between the interior walls 680 and 690 and the exterior surface 620 form solid regions 660 and 670 of the original precursor which provide the structural components S1 and S2 to the proppant particle. The interior walls 680 and 690 along with the elongated segment 650 form the boat component having a void space 640. Together, these form the entire proppant particle which will have the resistance to formation pressures contributed primarily from the structural components while gaining a reduced density by the boat component. The proppant particle will then have a net buoyancy. It is not necessary that the structural component radius $r_{sd}$ be the same for both structural components S1 and S2, nor is it essential that the exterior wall of the structural components be identically hemispherical. $R_{sd}$ is provided as a way of defining the general design criteria for the particle description. While a hemispherical end is depicted, this is not meant to limit the invention to this particular shape and others such as but not limited to flat or elongated may be used to provide additional features such as surfaces to which it may be easier to adhere or deviation may be due to manufacturing methods such as cutting, crimping, melting, pulling, or twisting.

Figure 7:
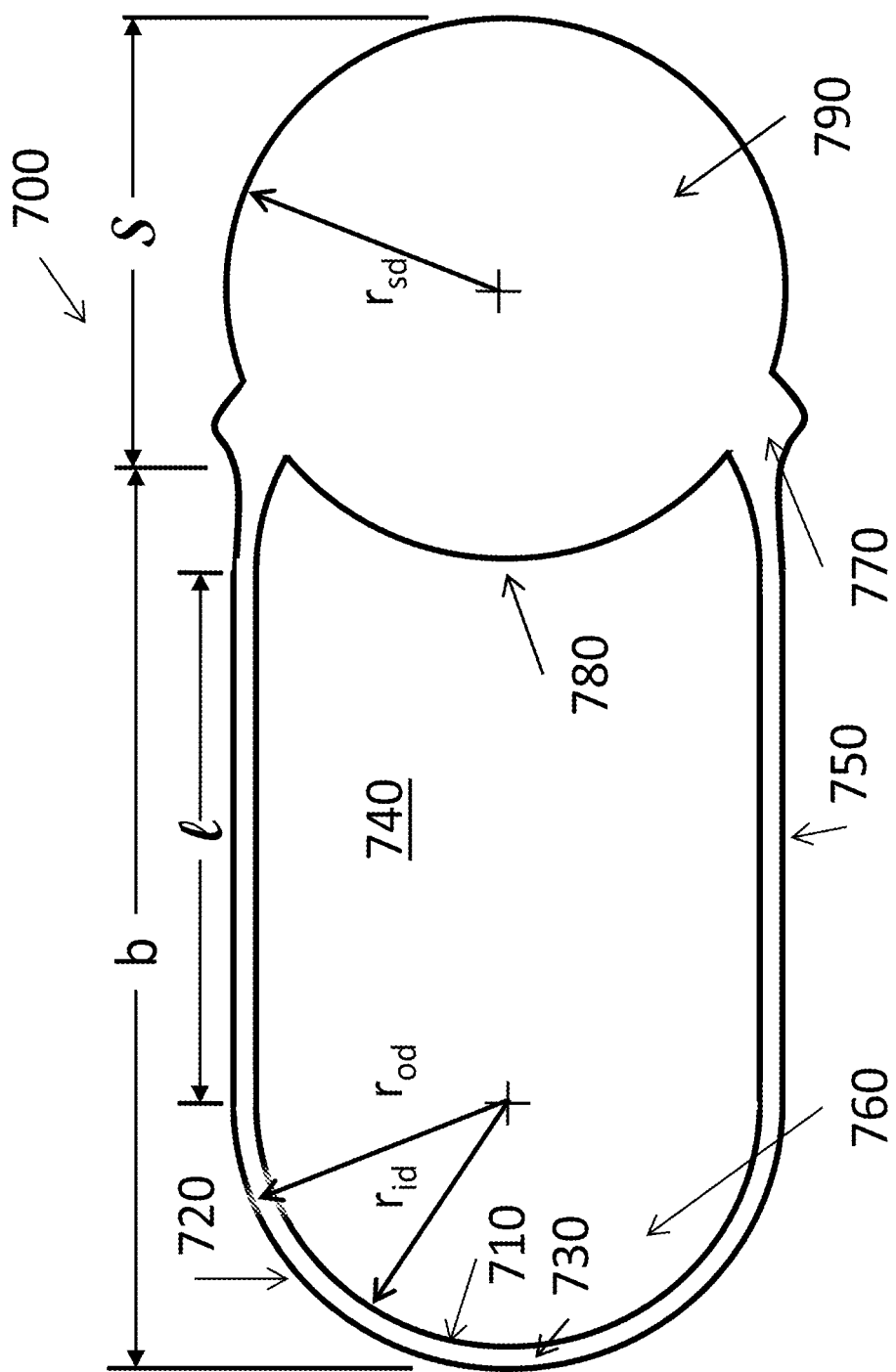
FIG. 7 is a partial cross-section showing a multi-component particle composed of a boat component and a single structure component where they are fused—Single Fused Proppant.

FIG. 7 represents a multiple component proppant particle in which the structural component S is comprised of a separately produced body 790 attached to a separately produced boat component b by fusing or fusion welding 770 the two into a single particle 700. For convenience of discussion, the proppant particle as described in FIG. 7 will be referred to as "Single Fused Proppant." The Single Fused Proppant particle 700 is composed of a boat component b and a structure component S. The boat component b is presented here as a closed ended elongated structure with one end nominally hemispherical 760 having a internal wall 710 of radius $r_{id}$ and external wall 720 of radius rod forming a boat component wall structure 730 which may be but is not required to be fully uniform throughout the boat component. While a hemispherical end is depicted, this is not meant to limit the invention to this particular shape and others such as flat or elongated may be used to provide additional features such as surfaces to which it may be easier to adhere or deviation may be due to manufacturing methods such as cutting, crimping, melting, pulling, or twisting.

The boat component also comprises of an elongated segment 750 of length l. It is allowable but not required that the two components be comprised of the same materials but must be selected such that a fusion bond or fusion weld 770 between them provides satisfactory performance under the conditions of use. The exterior wall of the structural component 790 may have a nominal radius $r_{sd}$ presenting an interior wall 780. The structural component presented here is a solid spherical shape for convenience of illustration but not meant to limit the actual shape of or density and may be spherical, elongated, or shaped to meet design requirements and may have a single or multiple void spaces internal or be fully solid to meet design requirements. When joined, the boat component and the structural component form a void 740. Because of the void space of the single fused proppant particle, a net density is produced to meet design requirements.

Figure 8:
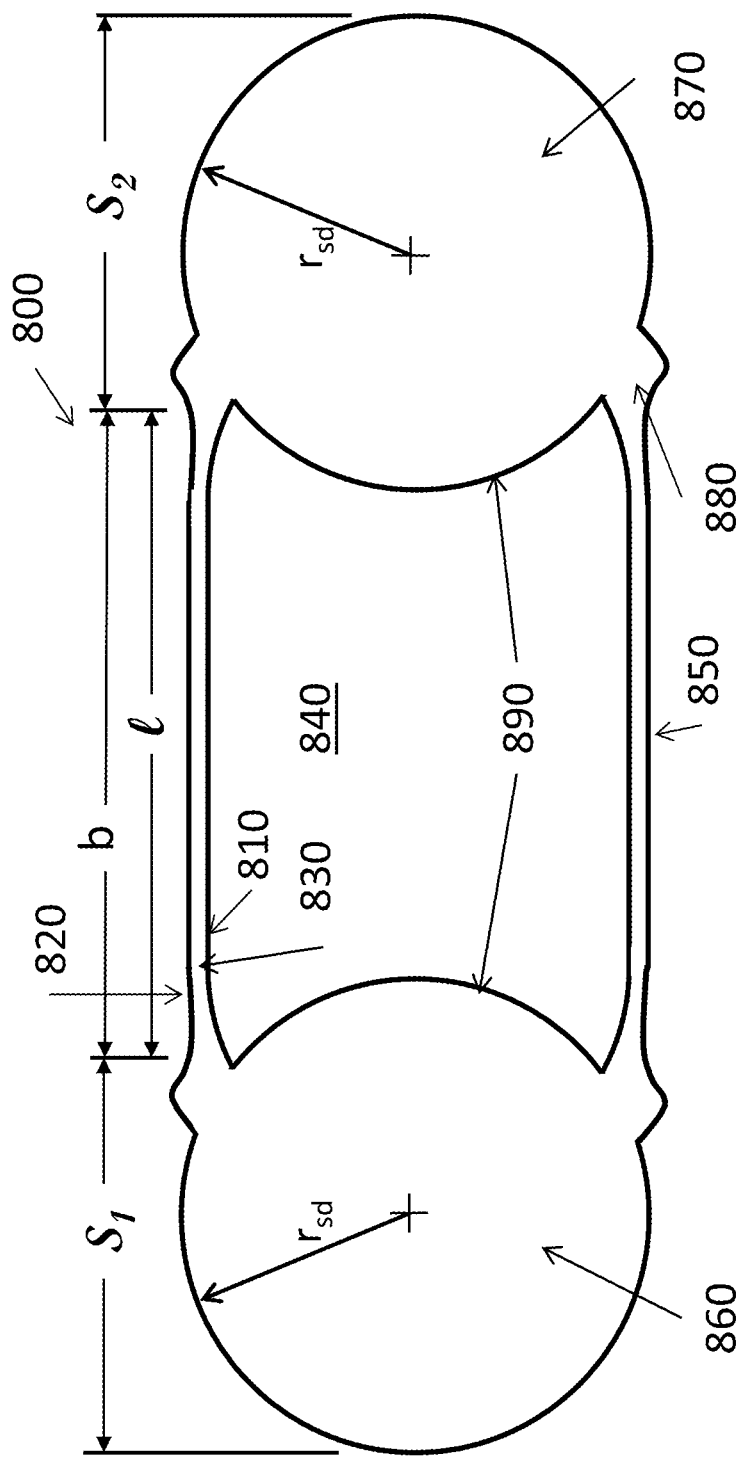
FIG. 8 is a partial cross-section showing a multi-component particle composed of a boat component and two structure components where they are fused—Double Fused Proppant under hydrostatic loading.

FIG. 8 represents a proppant particle in which two structural components S1 and S2 are comprised of separately produced body 860 and 870 attached to a separately produced boat component b by fusing or fusion welding 880 the components into a single particle 800. For convenience of discussion, the proppant particle as described in FIG. 8 will be referred to as "Double Fused Proppant." The Double Fused Proppant particle 800 is composed of a boat component b and two structure component S1 and S2.

The boat component b of length l is presented here as an elongated structure 850 having an internal wall 810 and an external wall 820 forming a boat structure wall 830 which may be but is not required to be fully uniform throughout the boat component. The two components may be comprised of the same materials but must be selected such that a fusion bond or fusion weld 880 between them provides satisfactory performance under the conditions of use. The exterior wall of the structural components 860 and 870 may have a nominal radius $r_{sd}$ presenting interior walls 890. The structural component presented here is a solid spherical shape for convenience of illustration but is not meant to limit the actual shape or density of the structural component and may be spherical, elongated, or otherwise shaped to meet design requirements and may have a single or multiple void spaces internal or be fully solid to meet design requirements. When joined, the boat component and the structural component form a void 840. Because of the void space of the single fused proppant particle, a net density is produced to meet design requirements.

Figure 9:
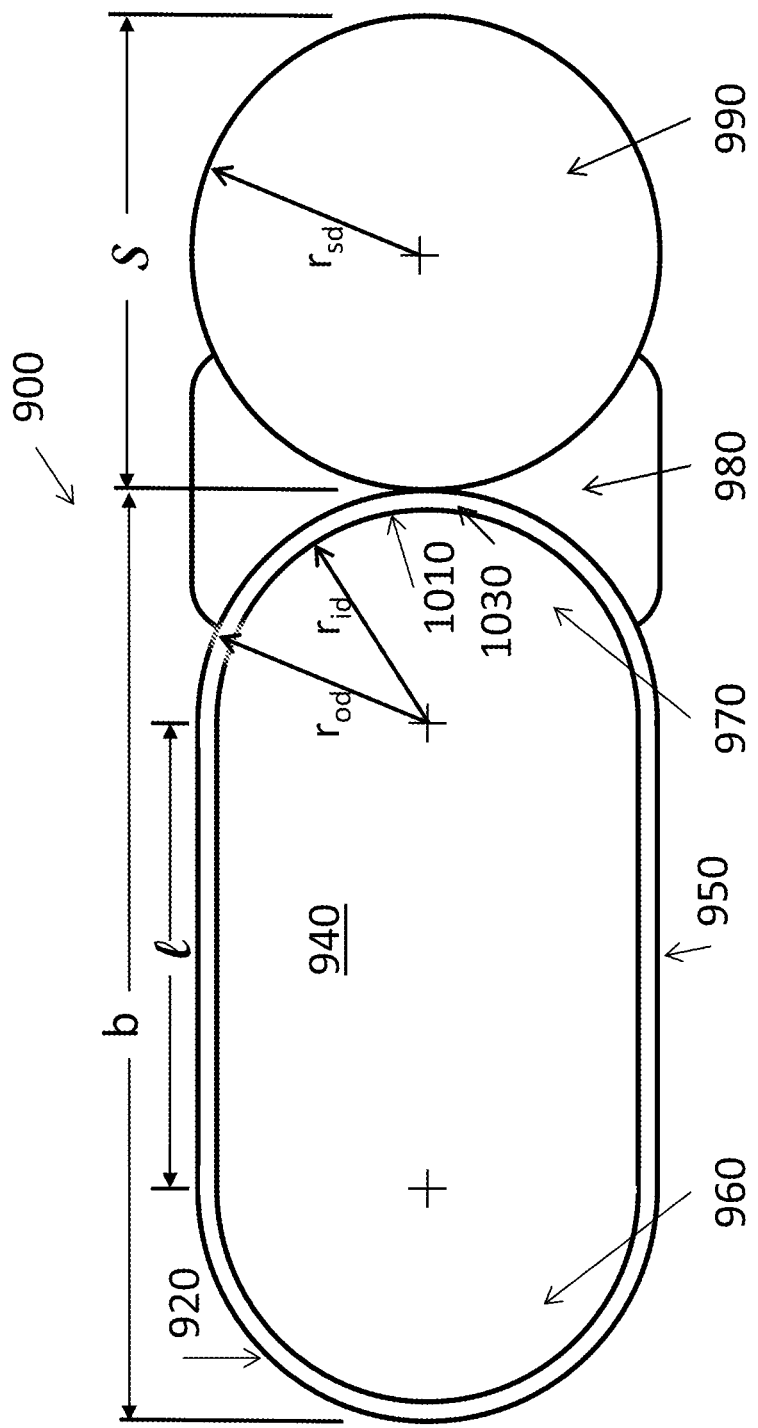
FIG. 9 is a partial cross-section showing a multi-component particle composed of a boat component and a single structure component where they are adhesively bonded—Single Bonded Proppant.

FIG. 9 represents a multiple component proppant particle in which the structural component S is comprised of a separately produced body 990 attached to a separately produced boat component b by bonding 980 the two into a single particle 900. For convenience of discussion, the multiple component proppant particle as described in FIG. 9 will be referred to as "Single Bonded Proppant." The Single Bonded Proppant particle 900 is comprised of a boat component b and a structure component S. The boat component b is presented here as a closed ended elongated structure with both ends nominally hemispherical 960 and 970 having an internal wall 910 of radius $r_{id}$ and external wall 920 of radius $r_{od}$ forming a boat structure wall 930 which may be but is not required to be fully uniform throughout the boat component. While a hemispherical end is depicted, this is not meant to limit the invention to this particular shape and others such as flat or elongated may be used to provide additional features such as surfaces to which it may be easier to adhere or deviation may be due to manufacturing methods such as cutting, crimping, melting, pulling, or twisting.

The boat component also comprises of an elongated segment 950 of length l. The boat component is, therefore, fully sealed and its density defined by dimension, materials, and wall thickness having formed a void space 940 to meet the desired characteristics. It is allowable but not required that the two components be comprised of the same materials but must be selected such that an adhesive bond 980 between them provides satisfactory performance under the conditions of use. The exterior wall of the structural component 990 may have a nominal radius $r_{sd}$. The structural component presented here is a solid spherical shape for convenience of illustration but not meant to limit the actual shape of or density and may be spherical, elongated, or shaped to meet design requirements and may have a single or multiple void spaces internal or be fully solid to meet design requirements. When joined, the boat component and the structural component form a single proppant particle 900. Because of the void space of the single fused proppant particle, a net density is produced to meet design requirements.

Figure 10:
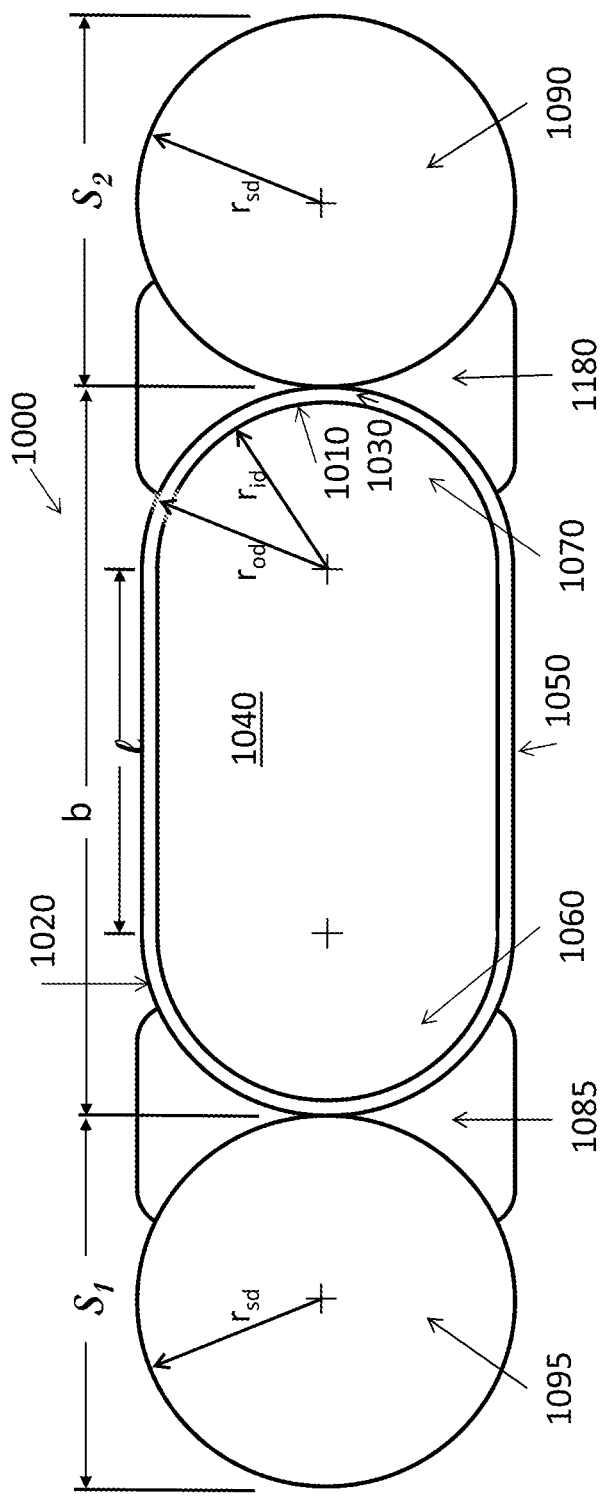
FIG. 10 is a partial cross-section showing a multi-component particle composed of a boat component and two structure components where they are fused—Double Bonded Proppant.

FIG. 10 represents a multiple component proppant particle in which two structural components S1 and S2 are comprised of separately produced body 1090 and 1090 attached to a separately produced boat component b by adhesive bonding 1080 and 1085 the components into a single particle 1000. For convenience of discussion, the multiple component proppant particle as described in FIG. 10 will be referred to as "Double Bonded Proppant." The Double Bonded Proppant particle 1000 is comprised of a boat component b and two structure components S1 and S2. The boat component b is presented here as a closed ended elongated structure with both ends nominally hemispherical 1060 and 1070 having a internal wall 1010 of radius $r_{id}$ and an external wall 1020 of radius $r_{od}$ forming a boat structure wall 1030 which may be but is not required to be fully uniform throughout the boat component. While a hemispherical end is depicted, this is not meant to limit the invention to this particular shape and others such as flat or elongated may be used to provide additional features such as surfaces to which it may be easier to adhere or deviation may be due to manufacturing methods such as cutting, crimping, melting, pulling, or twisting.

The boat component also comprises an elongated segment 1050 of length l. The boat component is, therefore, fully sealed and its density defined by dimension, materials, and wall thickness having formed a void space 1040 to meet the desired characteristics. The two components may be comprised of the same materials but must be selected such that a adhesion bond 1080 and 1085 between them provides satisfactory performance under the conditions of use. The exterior wall of the structural components 1060 and 1070 may have a nominal radius $r_{sd}$ presenting interior walls 1090. The structural component presented here is a solid spherical shape for convenience of illustration but not meant to limit the actual shape of or density and may be spherical, elongated, or shaped to meet design requirements and may have a single or multiple void spaces internal or be fully solid to meet design requirements. When joined by adhesive bond form a single bonded multiple component proppant particle with two structural components, a net density is produced to meet design requirements.

The boat component may have a surface that has minimal variations to its topology making it smooth or it may have a surface that was designed to have a specific topology that effects fluid flow, transport capabilities, porosity, load distribution, fracture behavior, or interaction with other particles.

The multiple component particle may have coatings which provide enhancement to structural integrity, fluid flow, transport capabilities, porosity, load distribution, fracture behavior, wettability, particle or fragment control, or interaction with other particles.

The present invention relates to a method for producing hollow elongated (hereafter referred to as cylindrical particle) boat component which may have one or both ends closed as presented above. The boat component may be made by method of forming a precursor which is then completed as a final shape which can then undergo post-processing as desired.

In one implementation, a boat component is produced by extruding a precursor hollow fiber tube from a melt to form a precursor hollow fiber. This fiber may be directly extruded and drawn to the appropriate wall thickness and OD as designed to meet specific needs as described above. The precursor fiber may be formed into hollow elongated particle having one or both ends closed as described above by cutting, crimping, breaking, melting, shrinking, thermally fusing, with or without the aid of external over-pressure and or internal vacuum, with or without the aid of rolling, pulling, or twisting the particle during sealing and separation or by any combination of any of these methods. The boat component formed of an appropriate length of the extruded precursor hollow fiber having the appropriate wall thickness may be first segregated from the fiber by first cutting, crimping, breaking, or a combination of these methods then the ends may be sealed through capillary action, surface tension, vacuum, or overpressure or a combination of these, facilitated by thermal heating of the particle or component thereof or its ends as necessary such that the ends soften to allow these actions to close the ends. The boat component of an appropriate length of the extruded precursor hollow fiber having the appropriate wall thickness may be first sealed through capillary action, surface tension, vacuum, or over-pressure or a combination of these facilitated by thermal heating of the boat component at the appropriate location to form the correct length particle such that the ends soften to allow these actions to close the ends. Subsequently, these boat components may be cut, crimped, broken, or a combination of these methods may be used to separate the particles from the precursor and each other. The boat components of an appropriate length of the extruded precursor hollow fiber having the appropriate wall thickness may concurrently be sealed through capillary action, surface tension, vacuum, or overpressure or a combination thereof facilitated by thermal heating of the particle at the appropriate location to form the correct length particle such that the ends soften to allow these actions to close the ends and to allow heating to continue till the particle is separated from the precursor due to thermal evaporation of the precursor material bridging two particles, capillary action such that the particles separate due to surface tension, or the particles may separate through mechanical separation from gravity, alternatively applied forces, torque, or pulling.

Figure 12:
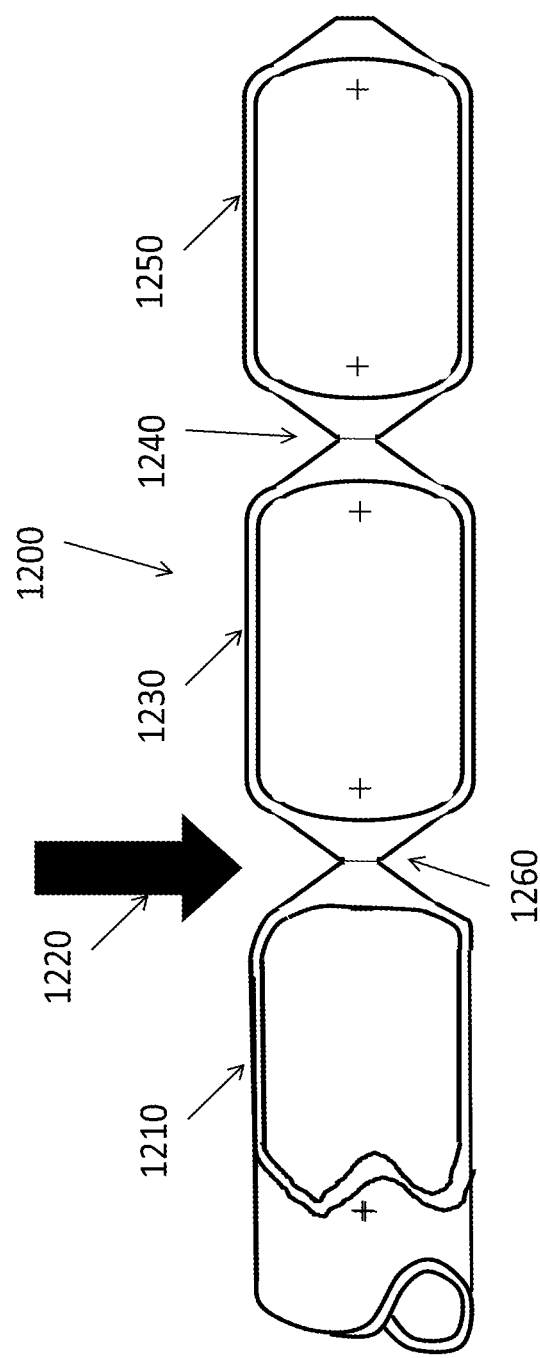
FIG. 12 is a partial cross-section of a method of making the boat component of a multiple component proppant from a hollow precursor.

FIG. 12 provides a general representation 1200 of a process for forming the particles from a precursor hollow fiber 1210. In FIG. 12 the precursor hollow fiber 1210 is shown divided into elongated hollow boat components 1230, 1250 of the desired length by one or more of the processes 1220 described above at locations 1260, 1240. For example, in forming a closed ended hollow elongated boat component a preformed hollow fiber 1210 of the appropriate transverse dimension and wall thickness may have heat applied by a focused flame 1220 at a specific longitudinal distance 1260 from a start point or prior constriction 1240 allowing surface tension and capillary action to cause a defined region of constriction 1260 the formed boat component 1230 being subsequently separated by breaking at the constriction. This example has been reduced to practice. Another example is to form as in the above example but to cut the structure at a desired location to form an open end. This, too, has been achieved.

The method as described above for creation of a hollow fiber precursor from the melt, through extrusion, or from a fiber created by pulling a fiber from a pre-form and subsequently processed into a hollow elongated boat component having one or both closed ends composed of glass such as but not limited to A, C, E, or S glass or uniquely formulated glass such as borosilicate glass formed of, for example, $SiO_2$, 80.6%; $B_2O_3$, 13.0%; $Na_2O$, 4.0%; $Al_2O_3$, 2.3%, glasses of calcinates, silicon oxides, sapphire, quartz, fused quartz, basalt based materials or a combination of these.

The method as described above for creation of a hollow fiber precursor from the melt, through extrusion, or from a fiber created by pulling a fiber from a pre-form and subsequently processed into a hollow elongated boat component having one or both ends closed may be composed of metals such as but not limited to magnesium, aluminum, silicon, titanium, chrome, iron, nickel, copper, zinc, germanium, or their alloys compounds, or combinations.

In one implementation, a boat component is produced by extruding through a die from a bulk of green sinterable material to form a precursor hollow fiber. This fiber may be directly extruded to the appropriate wall thickness and OD as designed to meet specific needs as described above. The precursor fiber may be formed into a hollow elongated particle having one or both ends closed as described above by cutting, crimping, breaking, melting, shrinking, thermally fusing, with or without the aid of external over-pressure or internal vacuum, with or without the aid of rolling, pulling, or twisting the particle during sealing and separation or by a combination of any of these methods. The boat component of an appropriate length of the extruded precursor hollow fiber having the appropriate wall thickness may be first segregated from the fiber first cutting, crimping, breaking, or a combination of these methods then the end or ends sealed through capillary action, surface tension, vacuum, or over-pressure or a combination facilitated by thermal heating of the particle or its end or ends such that the end or ends soften to allow these actions to close the end or ends. The boat component of an appropriate length of the extruded precursor hollow fiber having the appropriate wall thickness may be first sealed through capillary action, surface tension, vacuum, or overpressure or a combination facilitated by thermal heating of the particle at the appropriate location to form the correct length particle such that the end or ends soften to allow these actions to close the end or ends. Subsequently, these boat component may be cut, crimped, broken, or a combination of these methods to separate them from the precursor and each other. The boat component of an appropriate length of the extruded precursor hollow fiber having the appropriate wall thickness may concurrently be sealed through capillary action, surface tension, vacuum, or overpressure or a combination facilitated by thermal heating of the boat component at the appropriate location to form the correct length particle such that the end or ends soften to allow these actions to close the end or ends and to allow heating to continue until the particle is separated from the precursor due to thermal evaporation of the precursor material bridging two particles, capillary action such that the boat components separate due to surface tension, or the boat components separate through mechanical separation from gravity, alternatively applied forces, torque, or pulling. Once formed, the particles are sintered to form a ceramic or fused composite particle with fully contiguous walls.

The method as described above for creation of a hollow sphere or hollow elongated particle having one or both ends closed from a green sinterable material, through extrusion, and subsequently processed into a hollow sphere or hollow elongated particle having one or both ends closed may be composed of ceramics, such as but not limited to, clay, quartz, feldspar, kaolin oxides of alumina, beryllia, ceria, zirconia, carbides, nitrides, borides, silicides, or their combination. Or, the method as described above where the sinterable material is a combination of glasses, metals, or oxides of metals such as but not limited to boron nitride, silicon carbide, aluminum nitride, or their combinations. Or, the method as described above where the sinterable materials are particles of sufficiently small size, about 0.1% to 10% of the thickness of the wall, which are metals such as but not limited to magnesium, aluminum, silicon, titanium, chrome, iron, nickel, copper, zinc, germanium, or their alloys compounds, or combinations, or the oxides of metals such as but not limited to magnesium, aluminum, silicon, titanium, chrome, iron, nickel, copper, zinc, germanium, or their alloys compounds, or combinations.

Figure 13:
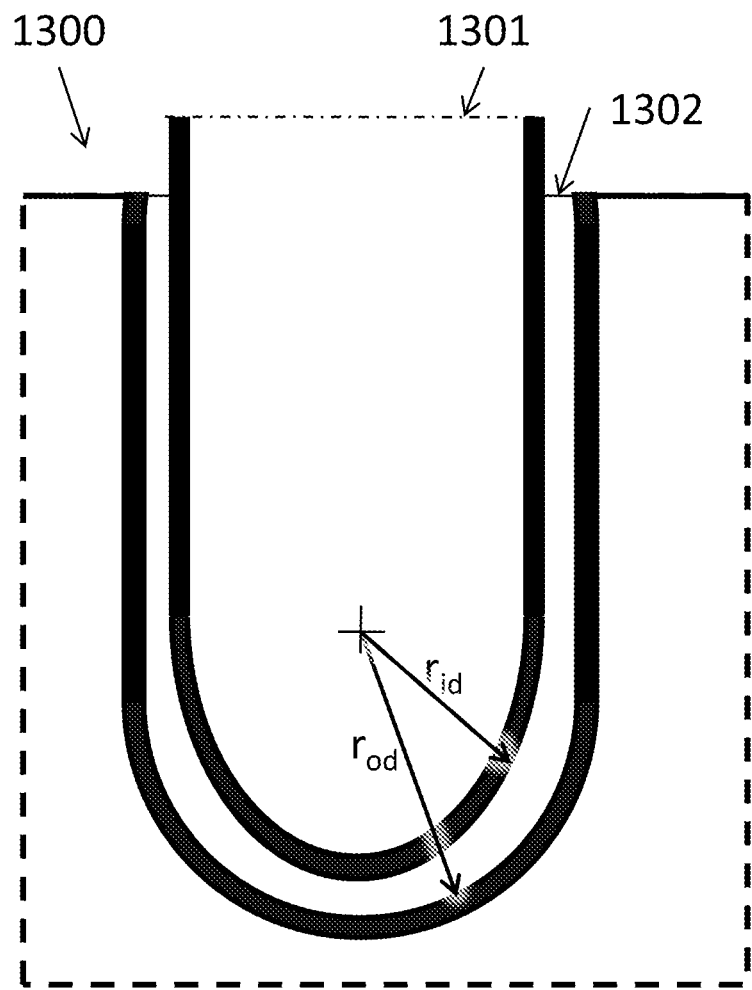
FIG. 13 shows a method of making the boat component of a multiple component proppant from a mold.

In one implementation, depicted in FIG. 13, a proppant particle is produced by forming from a bulk precursor between a female mold 1300 and a male core 1301 a hollow structure 1302 closed at one end, which forms the precursor for a hollow sphere or hollow elongated particle which may have one or both ends closed. A quantity of bulk precursor is injected in a malleable form such as but not limited to borosilicate glass at about 960° C. into a mold which will form the shape of the exterior of the particle but allow one end to remain open. Into that end, a male core 1301 is inserted to establish the appropriate void space in the center of the particle while ensuring the correct wall thickness. The male core 1301 creating the void is then withdrawn and the particle end remaining open will be subsequently sealed by cutting, crimping, breaking, melting, shrinking, thermally fusing, with or without the aid of external over-pressure or internal vacuum, with or without the aid of rolling, pulling, or twisting the particle during sealing or by a combination of any of these methods.

Figure 14:
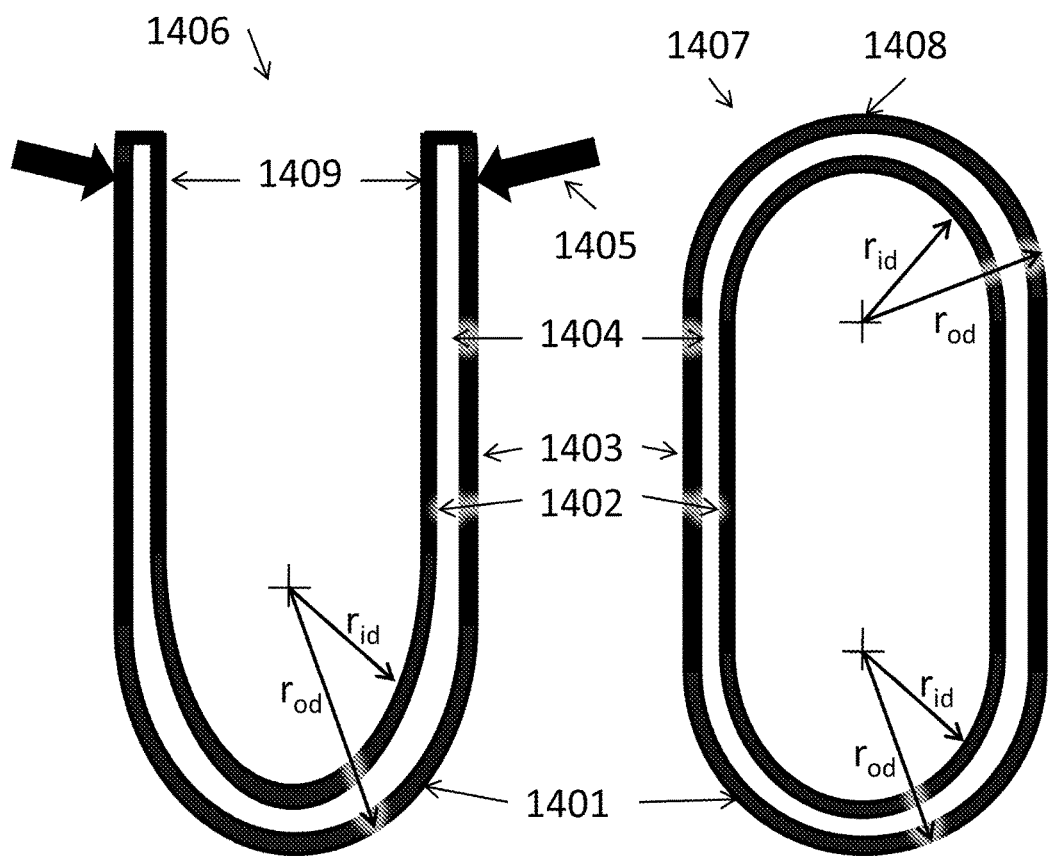
FIG. 14 shows a method of closing the boat component of a multiple component proppant that has been molded.

FIG. 14 illustrates an open ended elongated particle 1406 which may be subsequently closed as described above 1405 into the closed ended elongated particle 1407. These particles may be sealed in the mold or ejected from the mold and then sealed. It is also possible to allow the particle to have only one end closed and be ejected from the mold for subsequent processing should the boat component require such.

The method as described above for creation of a hollow sphere or hollow elongated particle having one or both ends closed from a green sinterable material, through extrusion, and subsequently processed into a hollow sphere or hollow elongated particle having one or both ends closed may be composed of ceramics, such as but not limited to, clay, quartz, feldspar, kaolin oxides of alumina, beryllia, ceria, zirconia, carbides, nitrides, borides, silicides, or their combination. Or, the method as described above where the sinterable material is a combination of glasses, metals, or oxides of metals such as but not limited to boron nitride, silicon carbide, aluminum nitride, or their combinations. Or, the method as described above where the sinterable materials are particles of sufficiently small size, about 0.1% to 10% of the thickness of the wall, which are metals such as but not limited to magnesium, aluminum, silicon, titanium, chrome, iron, nickel, copper, zinc, germanium, or their alloys compounds, or combinations, or the oxides of metals such as but not limited to magnesium, aluminum, silicon, titanium, chrome, iron, nickel, copper, zinc, germanium, or their alloys compounds, or combinations.

In one implementation, depicted in FIG. 13, a proppant particle is produced by forming from a bulk precursor between a female mold 1300 and a male core 1301 a hollow structure 1302 closed at one end, which forms the precursor for a hollow sphere or hollow elongated particle which may have one or both ends closed. A quantity of bulk precursor is injected in a malleable form such as but not limited to borosilicate glass at about 960° C. into a mold which will form the shape of the exterior of the particle but allow one end to remain open. Into that end, a male core 1301 is inserted to establish the appropriate void space in the center of the particle while ensuring the correct wall thickness. The male core 1301 creating the void is then withdrawn and the particle end remaining open will be subsequently sealed by cutting, crimping, breaking, melting, shrinking, thermally fusing, with or without the aid of external over-pressure or internal vacuum, with or without the aid of rolling, pulling, or twisting the particle during sealing or by a combination of any of these methods. FIG. 14 illustrates an open ended elongated particle 1406 which may be subsequently closed as described above 1405 into the closed ended elongated particle 1407. These particles may be sealed in the mold or ejected from the mold and then sealed. It is also possible to allow the particle to have only one end closed and be ejected from the mold for subsequent processing should the boat component require such.

In one implementation, a boat component is produced by extruding a precursor hollow fiber tube from the melt. Dynamically manipulating local temperature, surface tension and viscosity of a portion of melt-spun or extruded hollow glass, ceramic or basalt-based materials body to initiate or facilitate breakup of that hollow glass, ceramic or basalt-based materials body to bring about breakup into closed hollow segments of length, transverse dimension, and wall thickness suitable for use as a neutrally buoyant proppant, including by modulated radiant heat input such as a chopped laser beam, modulated reflectance, transmittance and or absorbance of another body or bodies.

In one implementation, a boat component is produced by extruding a precursor hollow fiber tube from the melt. Dynamically manipulating local temperature, internal and or external pressure, surface tension and viscosity of a portion of melt-spun or extruded hollow glass, ceramic or basalt-based materials body to initiate or facilitate breakup of that hollow glass, ceramic or basalt-based materials body to bring about breakup into closed hollow segments of length, transverse dimension, and wall thickness suitable for use as a boat component providing neutral buoyancy to the proppant particle, including by means such as modulated radiant heat input such as the local external pressure and or heat transfer around a melt-spun or extruded hollow glass, ceramic or basalt-based materials body may be utilized to initiate or facilitate breakup of that body into segments of desired length, to include the use of combustion and combustion products to produce modulation of external and or internal pressure, heat input and heat transfer.

In one implementation, the boat component according to the present invention might be produced by introducing molten glass, ceramic or basalt-based materials of a desired composition and properties into spinning container (melt spinner) with one or a plurality of suitably designed orifices for producing hollow fibers and thus producing hollow fibers at the exits of those said orifices. That spinning container may be surrounded with a plurality of electric arcs, plasma arcs or lasers (continuous wave, pulsed or modulated) whose beam direction lies substantially parallel to the axis of spin. Thus, by a suitable choice of process parameters including but not limited to: suitable control of process variables controlling speed of filament formation, number of orifices, speed of rotation, number of lasers or plasma arcs; suitable modulation of laser beams or arc parameters; it will be possible to chop the hollow fibers into closed hollow segments of desired length, transverse dimension, and wall thickness suitable for use as a boat component for neutrally buoyant proppant.

In another implementation, the hollow fiber may be formed as above from a spinning melt but the creation of the separate particles is brought about by the jet breakup via surface tension modulation into closed hollow segments of length, transverse dimension, and wall thickness suitable for use as a boat component for neutrally buoyant proppant claimed by the present inventions.

A method for separating a previously prepared hollow fiber as described above by rolling the heated precursor body between two platens, each composed of one or multiple bodies, and at least one of which possesses ridges or lands separated by grooves which serve close the hollow precursor body into multiple hollow boat component particles.

A method for forming individual hollow boat component particles by a discontinuous parison extrusion process combined with subsequent parison closure to form a hollow boat component particle of desired shape and size.

The methods described above provide hollow spherical or hollow cylindrical having one or both ends closed boat component particles. The initial and primary purpose of the invention is to create boat components with specific engineered characteristics.

EXAMPLES

[00134] A neutrally buoyant proppant for use in formations having 6,000 psi closure pressure and 10,000 psi hydrostatic pumping pressure can be developed according the above description. Furthermore, a design criterion of particle dimensionality not exceeding 1000 µm in external transverse dimension OD and 4000 µm in longitudinal dimension L is desired to ensure the particles pass through the pumping system, perforation, and through the fracture channel of interest. Using borosilicate glass for both the boat component and the structural component allows simplification of design. In general, the transverse dimension of the structural component may be equal to or less than the maximum particle transverse dimension. Since the boat component may be designed separately, it, too, may be equal to or less than the maximum particle dimension. This allows design pairing of the two. For example, it may be advantageous to maximize the transverse dimension of the boat component to optimize the buoyancy and to design an also maximized transverse dimension for the structural component to optimize the void space and flow channel dimensions. It may be equally important that the least number of the boats fracture in the particular formation which might drive a pairing in which the boat component is smaller than the structural component. Or, knowing the wall thickness of the boat component is thin and would make few shards or fines of any concern, it may be desired that the boats fracture to allow a predictable close packing of the structural components driving a boat transverse dimension greater than that of the structural component. For this design example, it is assumed that operational needs demand that both the boat and structural components be the same and equal to the maximum allowed.

A borosilicate solid sphere is assumed as the structural component. While an in-depth analysis could be provided showing the failure stress of such a sphere, it is sufficient for this illustrative example to state that in such hard rock formations as slate, borosilicate spheres of this dimensionality have demonstrated an ability to exceed 12,000 psi without fragmentation.

A wall thickness for the boat component would then be calculated to withstand the hydrostatic loading. Further, assume a safety factor of 10 for the failure load. Then, the 10,000 psi hydrostatic load is adjusted to 100,000 psi for failure limit. Knowing also our maximum transverse dimension to be 1000 µm then the outside radius is 500 µm. These parameters allow us to apply the equation presented above for hoop stress:

$$100,000 \text{ psi} = 10,000 \text{ psi} \times \frac{500 \text{ µm}}{t}$$

Solving for t:
t=50 µm

Therefore, our wall thickness should be 50 µm.

Figure 11:
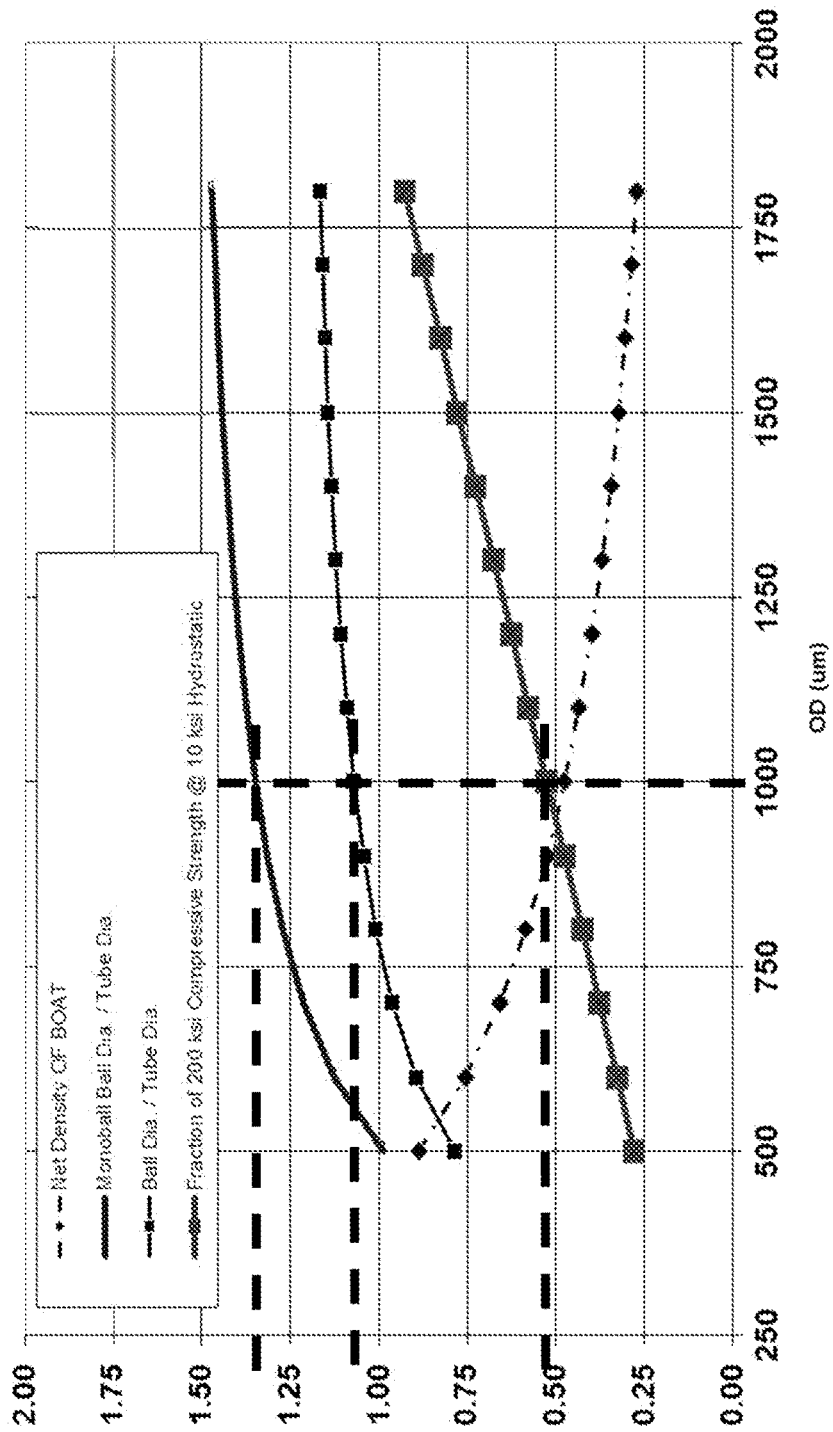
FIG. 11 is a graphical depiction of a 50 micron wall thickness boat component and relationship between Outside Diameter and structural component diameter to achieve neutral buoyancy.

Returning to FIG. 11, it can be seen that the graph has been defined for a boat component having a 50 µm wall thickness. This chart further assumes that the boat component is longitudinally twice the transverse dimension or 2000 µm long. A vertical line has been drawn at 1000 µm. It intersects with the straight black line (large square boxes) and indicates that it is at 50% of the failure stress for a particle of this type. Failure of the boat due to hydrostatic pressures is unlikely. It is possible then to examine where the vertical line intersects the light grey line (small square boxes) which provides the maximum diameter of a spherical structural component. This line assumes the single boat is attached to two structural components. This would correspond to a Double Proppant of any type, integral, fused, or bonded. It can be seen from the graph that the maximum OD for one of the structural components is approximately 1.06 the OD of the boat or 1060 µm. Clearly, attaching two 1000 µm structural components to the boat would provide neutral buoyancy within likely processing parameters. If it was desired to ensure a fully neutrally buoyant proppant particle, the longitudinal dimension of the boat component could be reduced.

The full length of the particle would then be 2000 µm for the boat component and two times each of the 1000 µm diameters of the structural components for a total longitudinal dimension of 4000 µm. If this exceeds the allowable dimensionality, it is clear that a number of parameters could be adjusted to reduce the length of the boat. Reducing the proppant particle diameter, boat and structure, reduces the longitudinal dimension of the boat as well to maintain neutral buoyancy. If the transverse dimension was reduced, as is allowed in the design criteria, the length of the boat component along with the diameters of the structural components would reduce providing a significantly reduced overall particle length.

The boat component of this proppant can be produced by being pulled from a pre-form hollow borosilicate glass rod softened in a furnace into a fiber which is then cut into particles and sealed concurrently using a high temperature plasma torch. If an Integral Proppant structure as described above, Single or Double, is to be produced, these the hollow fibers are exposed to additional heating until through capillary action and surface tension, the softened material forms the structural component. This can be done at one, Single, or both, Double, ends of the hollow fiber which forms the boat component. If only a Single is to be formed, the end is closed during the cutting process using the same thermal effect but to a lesser degree. This has been achieved.

In the case of both Fused and Bonded Proppant, a boat is formed separately to specified dimensions. In one example of production, a hollow core fiber is pulled from a pre-form tube to achieve the transverse and wall thickness dimensions. This hollow fiber is then shaped and closed using high temperature flame directed at the point desired and subsequently moved to the next position defining the particle longitudinal dimension. Once formed, the particles are broken free of the precursor and combined with the separately produced structural component.

In the case of Fused Proppant, an open ended boat component is brought into contact with a proppant particle and heat is applied to create a fused bond between the two components. This can be done with a single open ended boat and one structural particle, Single, or a double open ended boat and two structural particles, Double. This, too, has been achieved.

Bonded Proppant is produced in much the same manner but with a fully closed boat component in all cases and the structural component is adhered to the boat with an appropriate adhesive. This, too, has been achieved.

The elongated design with closed ends to form a boat which is maximized for buoyancy then combined with a structural particle maximized for structural requirements provides a unique method of achieving a reduced specific gravity manufactured proppant.

By retaining the structural strength while reducing the specific gravity of the proppant, the proppant will flow deeper into the fracture. If neutral buoyancy is achieved, the proppant may be expected to flow to the extents of the fracturing fluids or until the size of the fracture is less than that of the transverse dimension of the proppant. If reduced specific gravity is achieved but not sufficient to produce neutral buoyancy, then the fracturing fluid may be thickened to reduce the proppant falling out of solution prior to being pumped into the full extent of the fracture. The amount of thickening agent necessary to transport the proppant deep into the well is reduced versus that for conventional proppants. As a result, the reduced thickening agents will have a less deleterious effect on the pores of the formation.

A method of producing the structural component for the Integral Proppant particle is included herein. In the presentation of methods for producing the boat component, above, it was stated that the wall thickness need not be uniform and all methods presented allowed for this. For the integral Proppant, the wall thickness of one end, in the case of Single Integral Proppant, or both ends, in the case of Double Integral Proppant, may be thickened to form the structural component. An example of this would be that during the closing process using a focused flame, the region heated is broadened allowing capillary action and surface tension to form the softened material into fully dense ends of predictable dimensions. This method has been performed. It is also possible to form the ends into thicker segments to create the integrated structural component by molding as described above. It is also possible to form the ends into thicker segments to create the integral structural component shaping during closing as described above. If any of these methods for creating an integral thickened wall forming the structural component are applied to a single end of a boat component, the resulting proppant particle created is the Single Integral Proppant as described above. If any of these methods for creating an integral thickened wall forming the structural component are applied to both ends of a boat component, the resulting proppant particle created is the Double Integral Proppant as described above.

A method of forming a Fused Proppant particle is by forming the boat component as described above having one or both ends remaining unclosed and joining a structural component produced or obtained separately first by placing the structural component in physical contact with the end of the boat component to be fused and then fusing the end of the boat component to the structural component through thermal heating, melting, welding, sintering, thermal interdiffusion, friction melting, friction welding, reaction bonding, arc, plasma arc, or any means by which the adjacent surfaces are reduced to a single interior and exterior surface is included in this invention. If any of these methods for creating a fused joint between a single structural component and a single end of a boat component creates a single proppant particle, the resulting proppant particle created is the Single Fused Proppant as described above. If any of these methods for creating a fused joint between single structural components at each end of a boat component creates a single proppant particle, the resulting proppant particle created is the Double Fused Proppant as described above.

A method of forming a Bonded Proppant particle is by forming the boat component as described above having both ends closed and joining a structural component produced or obtained separately first by placing the structural component in physical contact with the end of the boat component and then applying adhesive to the junction or by applying adhesive to an appropriate segment of one or both component surfaces then placing them in physical contact thereby joining the end of the boat component to the structural component. Adhesives to create the bond between the boat component and the structural component may be but are not limited to glues, epoxies chemical solvents which soften and join the surfaces of the components, thermosets, thermoplastics, hydraulic or non-hydraulic cement, cements, is included herein. If any of these methods for creating an adhesive bond joint between a single structural component and a single end of a boat component creates a single proppant particle, the resulting proppant particle created is the Single Bonded Proppant as described above. If any of these methods for creating an adhesive bond between single structural components at each end of a boat component creates a single proppant particle, the resulting proppant particle created is the Double Bonded Proppant as described above.

A specific use for such engineered particles is as proppant for use in propping open a formation subsequent to or in conjunction with hydraulic fracturing of formation rock. The structural strength of the particle may be independently controlled while independently defining the specific gravity through adjustment of dimensions as described above. In this way, it is possible to produce a neutrally buoyant or substantially neutrally buoyant proppant that can withstand hydrostatic pressures experienced during the fracturing process and capable of withstanding formation closure pressures once in place. These particles will remain substantially intact following formation closure retaining a percolation network through the aggregate proppant. Proper selection of material from which the proppant is manufactured with or without coating may facilitate minimization of the creation of small particles or "fines." In this way, the proppant may be used in gas, oil or combination wells.

A specific use for such engineered particles is as packing to minimize sand flow into oil or gas wells. While it is possible to control the specific gravity of the particles, application of other controllable properties may be the focus of other uses. The particle may be engineered so that it can be of dimensions and strength such that it can maximize percolation network void space while being strong enough to withstand the environment in which it is used. Packing involves filling a well zone with a particle with sufficient strength to prevent degradation of the well bore or formation from occurring, such as migration of sand into the well while retaining a percolation network. For example, a particle could be designed which would not be damaged by the formation pressure but which had void spaces that allowed flow through the packing. Void space could also be designed such that it would restrict the flow of sand into the packing while retaining the percolation network.

A specific use for such engineered particles is as an additional component to drilling fluid. In many instances it is desirable to control the hydrostatic pressure imposed on subterranean structures or geological formations by the vertical column of drilling fluid. The inclusion of such engineered particles in the drilling fluid will allow control of the density of the vertical column of drilling fluid and thus provide control over the downhole pressure to reduce or eliminate damage to subterranean formations or structures.

A specific use for such engineered particles is as a vehicle for catalysts. The environment in which catalysis takes place may require particles of substantial strength yet a large surface area. These properties can be accomplished and independently defined through the methods described herein.

A specific use of the particles produced as described above is as a proppant but where the distribution of particle density may be engineered not as purely homogeneous, that is, a single density. Instead, an engineered distribution of particle densities may be produced or blended together from separately produced single density particles. Generally, it is believed that fractures in geological formations are oriented in a vertical direction, as fractures tend to grow perpendicular to the maximum compressive stress, which is usually vertical due to the weight of overburden. The distribution of particle densities would allow some particles to have a specific gravity less than that of the fracturing fluid, some particles neutrally buoyant with fracturing fluid, and some particles having a higher specific gravity than the fracturing fluid. A particle having an engineered density near to that of the fracturing fluid, but engineered to be lower or higher than the density of the fracturing fluid by a desired amount, will move upwards or downwards at a terminal velocity which is determined by the balance of forces due to the density difference between the particle and fluid (multiplied by the volume of the particle) and forces due to viscous drag, which are determined by the particle geometry, particle diameter, and the dynamic viscosity of the fracturing.

Figure 15:
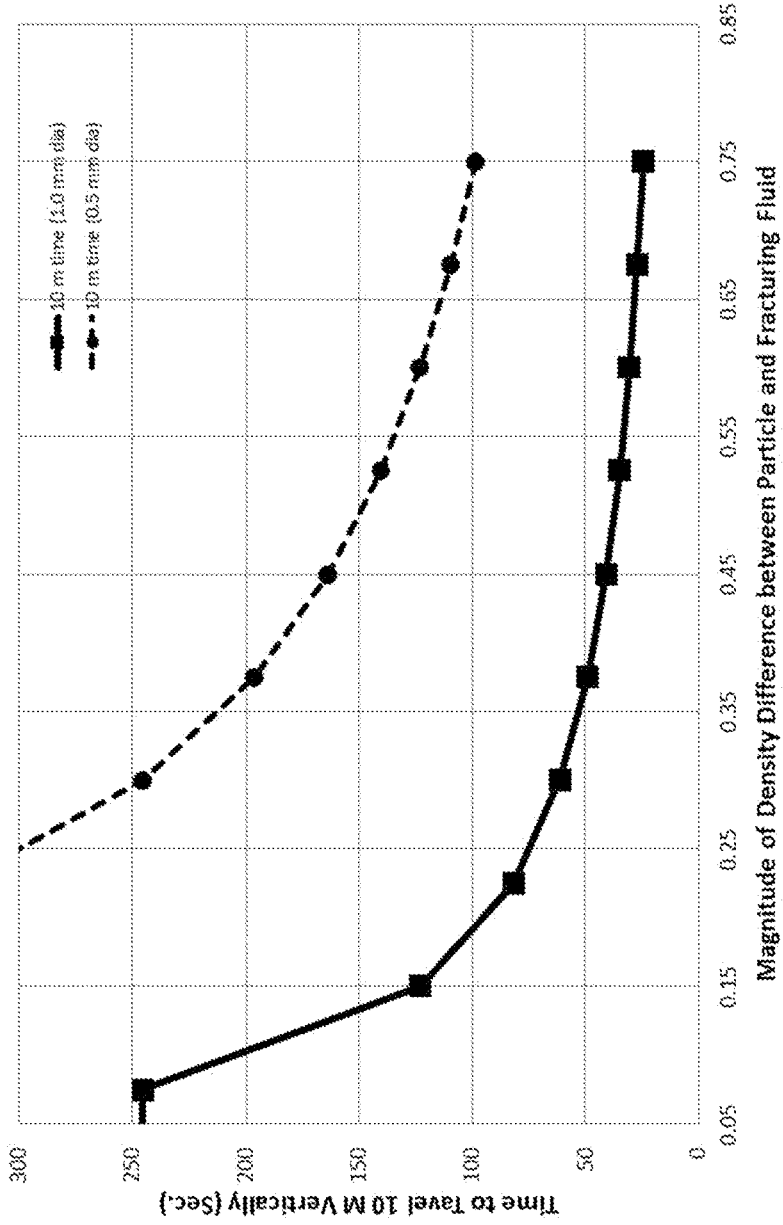
FIG. 15 is a graphical depiction of settling time of proppant particles in water.

In the following description of the invention, the geometry of the particle is taken as spherical for simplicity of description. FIG. 15 illustrates the time required for a spherical particle of given density difference from the fracturing fluid (taken for the illustrative example of FIG. 15 to have the density and dynamic viscosity properties of water at 20° C.) to travel 10 meters in the vertical direction for the range of density differences shown in FIG. 15. It will be understood that the present Invention is not limited to spherical shapes, nor is it limited solely to the particle diameters or transverse dimensions shown in FIG. 15. In fact in order to produce an engineered distribution of particle densities from a single precursor diameter and wall thickness it is advantageous to utilize intentional differences in length of elongated particles to produce the desired engineered distribution of particle densities. Additionally, the present invention is not limited to the range of density differences shown in FIG. 15. An elongated hollow closed-ended particle as disclosed in this document will have a somewhat different coefficient of viscous drag than a sphere of equal transverse dimension. Similarly, elongated particles of differing non-circular cross sections will have differing coefficients of viscous drag from each other. The viscous drag coefficient and therefore in particle terminal vertical velocity for an elongated particle will differ from that of a sphere as illustrated in FIG. 15. It will be understood that this difference in viscous drag coefficient and therefore in particle terminal vertical velocity will not to limit the scope of the invention. This would allow some desired fraction of the proppant to migrate to the tof the fracture zone, another desired fraction to remain in the central region of the fracture zone, and another desired fraction of the proppant to migrate to the lower region of the fracture zone. In this situation, the distribution of proppant particle densities may be utilized or tailored such that a desired fraction of the total proppant placed in the fractures segregates to the upper and lower extremities of the fractures, respectively. In such a situation, the increased resistance to fracturing fluid flow during the hydraulic fracturing process caused by the intentional build-ups of less dense and more dense proppant, respectively, at the tops and bottoms of the fracture, respectively, may be utilized to reduce the rate of growth of the fracture in those directions, with respect to the rate of growth in the horizontal direction.

The advantage of this approach is that it allows the creation of hydraulic fractures which are longer in the horizontal direction than in the vertical directions, and which may be controlled to grow to greater or lesser extents upwards and or downwards from the points of perforation or fluid injection. This control of vertical fracture growth may be desirable when the zone or geological formation being fractured is limited in vertical extent, or is intruded from below (generally) by water (coning) or above (generally) by gas breakthrough. It may also be desirable to limit the vertical extent of fracture growth to avoid other substantially horizontal structures such as other horizontal well bores. This situation may be described as controlled vertical screen-out, and is distinct from an existing process known as tip screen-out which is described, for example, in U.S. Pat. No. 7,237,612. The '612 patent discloses a screenout at the fracture tip due to a reduction in pumping flow rate, which allows proppant to build up near the fracture tip as fracturing fluid leaks off into the formation. In the method disclosed herein, the buildup of proppant at the top and bottom, respectively, of the fracture are due to the intentional engineered distribution of proppant densities. A specific use of the particles produced as described above is as a proppant where particles of different engineered densities are produced and inserted into the well during the fracturing process sequentially. Particles of lower density may be inserted in the initial fracturing fluid to facilitate the opening of the fracture; then, because of their lower density than the fracturing fluid, the particles would migrate to the upper region of the fracture. Subsequent proppant of greater density than the proppant fluid could be added to the fracturing fluid as it continues to be injected allowing the greater density proppant to flow into the full fracture and to migrate to the lower portion of the fracture. Subsequent proppant of substantially neutrally buoyancy could then be included in the fracturing fluid to allow the proppant to flow to the zone between the higher and lower density proppants. This sequence is not meant to be exclusive but exemplary and that any combination or sequence of different proppant buoyancies, sizes, or strengths may be used.

While the invention has been described in conjunction with specific exemplary implementations, it is evident to those skilled in the art that many alternatives, modifications, and variations will be apparent in light of the foregoing description. Accordingly, the invention is intended to embrace all such alternatives, modifications, and variations that fall within the scope and spirit of the appended claims.

What is claimed is:

1. A multiple component proppant particle for use in hydraulic fracturing, wherein a fracturing fluid is used to create and is inserted into a hydraulic fracture, the multiple component proppant particle comprising:
a boat component that includes a wall structure defining a transverse dimension and a longitudinal dimension of the boat component and one or more internal void spaces within the boat component, each void space also having transverse dimensions, such that the total transverse dimension of the void spaces is at least 0.3 times the maximum transverse dimension of the boat component; the wall structure being formed of a material that is substantially impervious to the fracturing fluid and providing the particle with sufficient strength to withstand hydrostatic pressure of the fracturing fluid;
one or more structural components produced separately from the boat component, the structural component providing the multiple component proppant particle with sufficient structural strength to stop the fracture from fully closing; and
a fusion bond or fusion weld that attaches each of the one or more structural components to the boat component to form the multiple component proppant;
wherein the multiple component proppant particle has a density that is substantially similar to the density of the fracturing fluid.

2. The multiple component proppant particle of claim 1, having two structural components that are formed of the same material as the boat component, the two structural components and the boat component having been designed and produced separately from a single precursor, the fusion bond or fusion weld attaches the two structural components to the boat component to form a multiple component proppant particle.

3. The multiple component proppant particle of claim 1, having two structural components.

4. The multiple component proppant particle of claim 1, having two structural components formed from a different material from the boat component.

5. The multiple component proppant particle of claim 1, wherein the wall structure is formed of glass, metal, or ceramic materials, or a combination thereof.

6. The multiple component proppant particle of claim 5, wherein the wall structure is formed of one or more of silicon oxides, sapphire, quartz, fused quartz, silicon nitride, silicon carbide, or combination thereof.

7. A plurality of multiple component proppant particles for use in hydraulic fracturing, wherein a fracturing fluid is inserted into a hydraulic fracture having both vertical and horizontal extents; each of the multiple component proppant particles comprising:
a boat component that includes a wall structure defining a transverse dimension and a longitudinal dimension of the boat component and one or more internal void spaces within the boat component, each void space also having transverse dimensions, such that the total transverse dimension of the void spaces is at least 0.3 times the maximum transverse dimension of the boat component; the wall structure being formed of a material that is substantially impervious to the fracturing fluid and providing the particle with sufficient strength to withstand hydrostatic pressure of the fracturing fluid; and
one or more structural components produced separately from the boat component, the structural component providing the multiple component proppant particle with sufficient structural strength to stop the fracture from fully closing; and
a fusion bond or fusion weld that attaches each of the one or more structural components to the boat component to form the multiple component proppant;
wherein the plurality of multiple component proppant particles has a predetermined range and distribution of densities with respect to the density of the fracturing fluid and a range of dimensions such that predetermined fractions of the plurality of multiple component proppant particles rise and sink, respectively, so as to control the vertical extent of the fracture in relation to its horizontal extent.

8. The plurality of multiple component proppant particles of claim 7, wherein the wall structure of the particles is formed of glass, metal, or ceramic materials, or a combination thereof.

9. The multiple component proppant particle of claim 8, wherein the wall structure is formed of one or more of silicon oxides, sapphire, quartz, fused quartz, silicon nitride, silicon carbide, or combination thereof.

10. The plurality of multiple component proppant particles of claim 7, in which at least one of the multiple component proppant particles has two structural components.

11. The plurality of multiple component proppant particles of claim 7, in which at least one of the multiple component proppant particles has two structural components that are formed of a different material from the boat component.

* * * * *